United States Patent
Liongosari

(10) Patent No.: US 7,099,854 B2
(45) Date of Patent: Aug. 29, 2006

(54) KNOWLEDGEBASE FRAMEWORK SYSTEM

(75) Inventor: Edy S. Liongosari, Wheeling, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 11/060,722

(22) Filed: Feb. 17, 2005

(65) Prior Publication Data
US 2005/0165764 A1    Jul. 28, 2005

Related U.S. Application Data

(62) Division of application No. 09/520,578, filed on Mar. 8, 2000, now Pat. No. 6,957,205.

(51) Int. Cl.
*G06F 7/00* (2006.01)
*G06N 5/00* (2006.01)

(52) U.S. Cl. ............... 706/45; 706/14; 706/12
(58) Field of Classification Search ............ 706/45, 706/14, 12; 711/1
See application file for complete search history.

(56) References Cited

U.S. PATENT DOCUMENTS

| | | | |
|---|---|---|---|
| 5,506,984 A | 4/1996 | Miller | 395/600 |
| 5,590,250 A | 12/1996 | Lamping et al. | 395/127 |
| 5,608,900 A | 3/1997 | Dockter et al. | 395/613 |
| 5,619,632 A | 4/1997 | Lamping et al. | 395/141 |
| 5,644,740 A | 7/1997 | Kiuchi | 395/357 |
| 5,659,724 A | 8/1997 | Borgida et al. | 395/603 |
| 5,745,895 A | 4/1998 | Bingham et al. | 707/10 |
| 5,768,578 A | 6/1998 | Kirk et al. | 395/611 |
| 5,794,257 A | 8/1998 | Liu et al. | 707/501 |
| 5,801,702 A | 9/1998 | Dolan et al. | 345/357 |
| 5,983,218 A | 11/1999 | Syeda-Mahmood | 707/3 |
| 6,012,055 A | 1/2000 | Campbell et al. | 707/5 |
| 6,018,735 A | 1/2000 | Hunter | 707/5 |
| 6,031,537 A | 2/2000 | Hugh | 345/357 |
| 6,035,300 A | 3/2000 | Cason et al. | 707/102 |
| 6,037,944 A | 3/2000 | Hugh | 345/357 |
| 6,038,668 A | 3/2000 | Chipman et al. | 713/201 |
| 6,052,693 A | 4/2000 | Smith et al. | 707/104 |
| 6,141,662 A * | 10/2000 | Jeyachandran | 707/2 |
| 6,166,736 A | 12/2000 | Hugh | 345/340 |
| 6,166,739 A | 12/2000 | Hugh | 345/357 |
| 6,236,994 B1 | 5/2001 | Swartz et al. | 707/6 |

(Continued)

FOREIGN PATENT DOCUMENTS

WO    WO 97/38376    10/1997

OTHER PUBLICATIONS

Delany, P., and Landow, G.P., "Hypermedia and Literary Studies," pp. 60-61, 71-72, 74-75, 99, 290-291; The MIT Press, Cambridge Mass. And London, England, 1991.

(Continued)

*Primary Examiner*—Joseph P. Hirl
(74) *Attorney, Agent, or Firm*—Brinks Hofer Gilson & Lione

(57) ABSTRACT

A system, method and article of manufacture are provided for a knowledgebase framework. Information is obtained from at least one source utilizing a network. Utilizing a knowledge model, an index is generated for the obtained information. The generated index includes a plurality of items each associated with at least some of the obtained information. Utilizing the network, the generated index is displayed to a user. The user is permitted to select an least one of the items of the index. The information associated with the selected item is then displayed to the user utilizing the network.

24 Claims, 29 Drawing Sheets

U.S. PATENT DOCUMENTS

| | | | | |
|---|---|---|---|---|
| 6,256,032 | B1 | 7/2001 | Hugh | 345/357 |
| 6,289,353 | B1 | 9/2001 | Hazlehurst et al. | 707/102 |
| 6,356,897 | B1 | 3/2002 | Gusack | 707/4 |
| 6,446,061 | B1 | 9/2002 | Doerre et al. | 707/3 |
| 6,446,076 | B1 | 9/2002 | Burkey et al. | 707/102 |
| 6,487,545 | B1 | 11/2002 | Wical | 706/45 |
| 2002/0147880 | A1* | 10/2002 | Wang Baldonado | 711/1 |
| 2003/0033299 | A1* | 2/2003 | Sundaresan | 707/5 |
| 2003/0110181 | A1* | 6/2003 | Schuetze et al. | 707/103 R |
| 2003/0187726 | A1* | 10/2003 | Bull et al. | 705/14 |
| 2003/0208473 | A1* | 11/2003 | Lennon | 707/3 |
| 2005/0075964 | A1* | 4/2005 | Quinn et al. | 705/37 |

OTHER PUBLICATIONS

Findler, N.V., "Associative Networks: Representation and Use of Knowledge by Computers," pp. xv-xvi, 51-54, 62-63, 179-180; Academic Press, New York, 1979.

Date, C.J., "An Introduction to Database Systems," pp. 38-39, 48-52, 491-493, 792-797; vol. I, Fifth Ed., Addison-Wesley System Programming Series, © 1990 Addison-Wesley Publishing Co., Inc. Screenshots from Visio 4.0 for Microsoft Windows, © 1991-1995 Vision Corporation.

Poulovassilis, A. and Levene, M., "A Nested-Graph Model for the Representation and Manipulation of Complex Objects," pp. 35-68, ACM Transactions on Information Systems, vol. 12, No. 1, Jan. 1994.

Wang, B., Hitchcock, P., Holden, T., "Linking Object Oriented Database and Hypertext to Support Software Documentation," pp. 149-156, ACM SIGDOC '92, Proc. 10th Ann. Int. Conf. on Systems Documentation, © ACM 1992.

Baecker, H.D., "Garbage Collection for Virtual Memory Computer Systems," pp. 981-986, Comm. of the ACM, vol. 15, No. 11, Nov. 1972 © 1972, Association for Computing Machinery, Inc.

Swaminathan, K., "RA: A Memory Organization to Model the Evolution of Scientific Knowledge," pp. 23-30, 62-79, COINS Technical Report 90-80, Sep. 1990.

Halasz, F.G., Moran, T.P., Trigg, R.H., "NoteCards in a Nutshell," pp. 45-51, Proceedings of CHI'87, © 1987 ACM.

Andrews, K., "Visualising Cyberspace: Information Visualisation in the Harmony Internet Browser," pp. 97-104, Proc. Of First IEEE Symposium on Information Visualization, Atlanta, GA, Oct. 1995.

Mukherjea, S., Foley, J.D., "Visualizing the World-Wide Web with the Navigational View Builder," Computer Networks & ISDN System, Special Issue on 3rd Int. Conf. On the World-Wide Web '95, Apr. 1995, Darmstadt, Germany.

Lamping, J., Rao, R., Pirolli, P., "A Focus+Context Technique Based on Hyperbolic Geometry for Visualizing Large Hierarchies," pp. 1-8, Reprinted From: Proc. ACM SIGCHI Conf. On Human Factors in Computing Systems, Denver, May 1995, ACM.

Robertson, G.G., Mackinlay, J.D., Card, S.K., "Cone Trees: Animated 3D Visualizations of Hierarchical Information," pp. 189-193, Proc. Conf. Human Factors in Computing Systems (CHI'91) © ACM 1991.

Kumar, H.P., Plaisant, C., Shneiderman, B., "Browsing Hierarchical Data with Multi-Level Dynamic Queries and Pruning," pp. 1-6 of 24, and 22 of 24; Int. Jour. Human-Computer Stud., 1996, 46(1); URL: ftp://ftp.cs.umd.edu/pub/hcil/Reports-Abstracts-Bibliography/3474.

Hara, Y., Keller, A.M., Rathmann, P.K., Wiederhold, G., "Implementing Hypertext Database Relationships through Aggregations and Exceptions," pp. 1-4, Stanford Technical Report, 1991.

Miriyala, K., Hornick, S.W., Tamassia, R., "An Incremental Approach to Aesthetic Graph Layout," Proc. 6th Int. Workshop on Computer-Aided Software Engineering, CASE '93, 1993.

Roth, S.F., Kolojejchick, J., Mattis, J., Goldstein, J., "Interactive Graphic Design Using Automatic Presentation Knowledge," pp. 112-117 & p. 476, Proc. Of CHI'94 Conf. Boston, Apr. 1994 © 1994 ACM.

Mackinlay, J., "Automating The Design of Graphical Presentations of Relational Information," ACM, pp. 110-141, ACM Transactions on Graphics, vol. 5, No. 2, Apr. 1986.

Ichimura, S. and Matsushita, Y., "Another Dimension to Hypermedia Access," pp. 63-72, Hypertext '93 Proceedings, © ACM 1993.

Schneiderman, B., "Designing the user interface: Strategies for effective human-computer interaction," Reading, Addison Wesley, US, 1992, pp. 519-521, 526, XP-002210867.

Computer Networks and ISDN Systems 28 (1996) 1027-1036, Open Information Services, Leslie Carr, Gary Hill, David De Roure, Wendy Hall, Hugh Davis.

Rhodes, B.J., Starner, T., "Remembrance Agent: a continuously running automated information retrieval system," The Proceedings of the First International Conference on the Practical Application of Intelligent Agents and Multi Agent Technology, PAAM 1996, pp. 487-495.

A. Voss, K. Nakata, M. Juhnke, "Concept Indexing," GROUP 99 Phoenix, Arizona, USA, Nov. 14-17, 1999, Copyright ACM 1999, pp. 1-10, XP002255123.

M. Lee and K. Foong, "A Knowledge Acquisition Framework for an Intelligent Decision-Support System," Proceedings of the 1994 Second Australian and New Zealand Conference on Brisbane, QLD, Australia, Nov. 29-Dec. 2, 1994, pp. 432-436, XP010136758.

N. Lavrac and I. Mozetic, "Second generation knowledge acquisition methods and their application to medicine," Deep Models for Medical Knowledge Engineering, E. Keravnou Editor, © 1992 Elsevier Science Publishers BV.

Rennison, E., Galaxy of News, "An Approach to Visualizing and Understanding Expansive News Landscapes," pp. 3-12, Visible Language Workshop, MIT Media Lab, in USIT '94, Marina Del Rey, California, 1994.

Lamping, J., Rao, R., Pirolli, P., "A Focus+Context Technique Based on Hyperbolic Geometry for Visualizing Large Hierarchies," pp. 1-16, Xerox Palo Alto Research Center, Palo Alto, CA 1995 © ACM.

* cited by examiner

KNOWLEDGEBASE FRAMEWORK SYSTEM

The present patent document is a division of application Ser. No. 09/520,578, filed Mar. 8, 2000, now U.S. Pat. No. 6,357,205, which is incorporated herein by reference.

FIELD OF THE INVENTION

The present invention relates to information management and retrieval and more particularly to frameworks for obtaining, managing, and providing information from a plurality of information sources.

BACKGROUND OF THE INVENTION

People who use computer systems and networks often need to look up information about the system they are using. Traditionally, information was stored in books and manuals, which were often kept physically near to the computer. If a user needed to look up information, he turned to a single source—the paper manuals stored conveniently nearby.

Currently, however, the amount of technical information available about a given computer system can be very large and can be stored at a wide variety of sources. Information is often provided to customers in "online" form, dispensing entirely with paper copies. This online information includes online databases, CD ROM databases, proprietary help systems, and online manuals. Large amounts of technical information are also available from third party online sources and from sources such as the World Wide Web.

Amid an apparent wealth of online information, people still have problems finding the information they need. Online information retrieval may have problems including those related to inappropriate user interface designs and to poor or inappropriate organization and structure of the information. Storage of information online in a variety of forms leads to certain information retrieval problems, several of which are described below.

The existence of a variety of information sources leads to the lack of a unified information space. An "information space" is the set of all sources of information that is available to a user at a given time or setting. When information is stored in many formats and at many sources, a user is forced to spend too much "overhead" on discovering and remembering where different information is located (e.g., online technical books, manual pages ("manpages"), release notes, help information, etc.). The user also spends a large amount of time remembering how to find information in each delivery mechanism. Thus, it is difficult for the user to remember where potentially relevant information might be, and the user is forced to jump between multiple different online tools to find it.

The existence of a variety of information sources leads to information strategies that lack cohesion. Users currently must learn to use and remember a variety of metaphors, user interfaces, and searching techniques for each delivery mechanism and class of information. No one type of interface suits all users. Furthermore, a user may need different types of searching techniques and interfaces, depending on the circumstances and the nature of the specific information needed.

The existence of a variety of information sources leads to lack of links between sources of information. Conventional delivery mechanisms often support only loosely structured navigation, such as keyword search or hyperlinks. Such mechanisms provide the user with only a local organization of information instead of providing a global picture of the information space.

The existence of a variety of information sources leads to frustration if the information uses a wide variety of terms or uses terms not familiar to the user. In addition, users employ concepts and terms differently than technical writers and authors. Conventional delivery mechanisms often rely on a keyword search as a primary means of finding information. If the user's vocabulary does not sufficiently overlap with indices employed by a delivery mechanism, a keyword search will result in a high percentage of disappointing and frustrating "term misses." The only recovery method for a failed keyword search is simply to guess at better query.

The existence of a variety of information sources leads to titles and descriptions of the information that are not intuitive to a user. Users often conceptually group and describe problems differently than do information organizers and writers. If, for example, a user does not know the title of a book or the name of a database, he may not be able to find the information stored therein.

As computer systems become more complex and as sources of online information proliferate, it becomes more and more difficult for users to locate the information they need. Even worse, users may not always be aware of all the existing sources of information. Moreover, certain users may not use certain sources of information, even though they are aware of them, if they are not familiar with the interface or find it too difficult to use.

SUMMARY OF THE INVENTION

A system, method and article of manufacture are provided for a knowledgebase framework. Information is obtained from at least one source utilizing a network. Utilizing a knowledge model, an index is generated for the obtained information. The generated index includes a plurality of items each associated with at least some of the obtained information. Utilizing the network, the generated index is displayed to a user. The user is permitted to select an least one of the items of the index. The information associated with the selected item is then displayed to the user utilizing the network.

In an aspect of the present invention, one of the sources from which information is obtained may be an internal source. In another aspect of the present invention, one of the sources from which information is obtained may be an external source accessible utilizing a wide are network. In a further aspect of the present invention, the information obtained from the sources may include pharmaceutical information. In yet a further aspect of the present invention, displaying of the information associated with the selected item (or entry) to the user may also include utilizing the network to retrieve the associated information from the source from which the associated information was obtained. In even another aspect of the present invention, the network may be capable of communicating using TCP/IP protocol.

In an embodiment of the present invention, the network may be utilized to monitor one or more of the sources for updated information relating to one or more items in the index. In such an embodiment, when updated information is detected at one of the knowledge sources, a notice may be generated regarding the updated information. This notice may then be transmitted to the user utilizing the network to notify the user of the updated information. As an option, the user may be allowed to select the source(s) to be monitored for updates or other changes.

In another embodiment of the present invention, the user may be permitted to input a search term utilizing the network. The index may be searched for items associated with the search term. Items of the index associated with the search term may then be displayed to the user utilizing the network.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

Embodiments of the present invention show how the concept of knowledge integration can be applied in the business world, especially in the pharmaceutical industry. Aspects of the present invention may be targeted for users active in the drug discovery process such as scientist and other researchers. Embodiments of the present invention may use knowledge integration technology to semantically integrate the knowledge capital located in various isolated repositories in the Internet. The information from this repositories are extracted and are classified based on various facets such as, for example drug, chemical compound, biological target, scientist, etc. As the results, embodiments of the present invention can graphically show users how the various facets of the information are related to each other.

Figure 1:
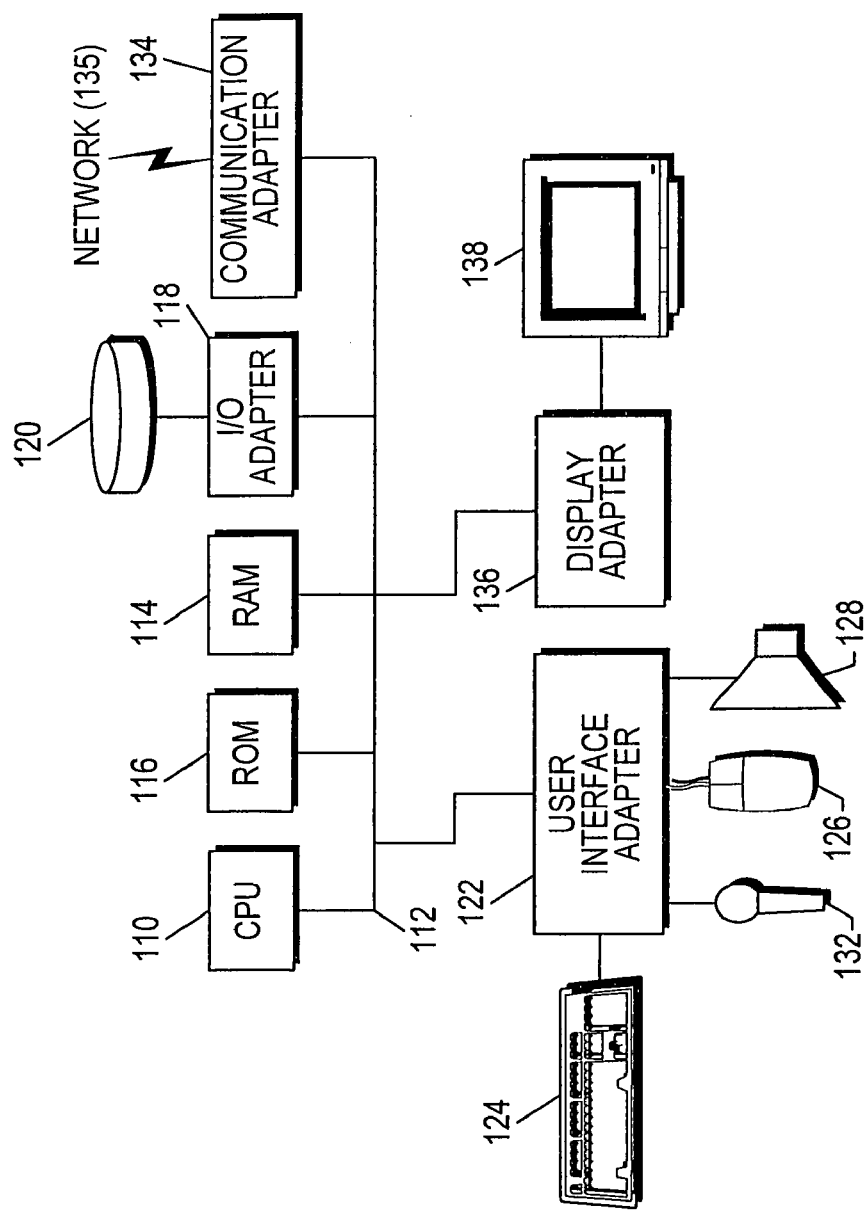
FIG. 1 is a schematic diagram of a hardware implementation of one embodiment of the present invention.

An embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

To improve the decision making process, it may be helpful to deliver the right information to the right person at the right time. For example, the right information may include information from all parts of the organization and from external sources, information in the context of the business process (regardless of the source or format), and relevant information about business entities and relationships (rather than keywords and documents). Delivering the right information to the right person may involve filtering of the information based on needs of the individual, and delivery of the filtered information to the individual or team. The right time may mean providing up-to-date information and information on demand. Several challenges exist today that can make it difficult to meet these requirements. For example, both internal and external information may exist in different environments, platforms, formats such as proprietary databases, project reports and e-mail messages. Additionally, the underlying information repositories due to the heterogeneous nature, will need to remain unaltered because scientists and other business process participants store their information in diverse formats and the development of new applications using the repositories will continue, often in isolation. Further, traditional techniques of integration can be very time consuming to develop and often inflexible to rapid change. For instance, an average data-warehousing project typically takes between nine and twelve months to complete and most of these projects will typically only integrate structured information. Also, external information can be even a greater challenge: there are over one billion web pages (with this number doubling every four months) and not all sites are useful or trustworthy.

With embodiments of the present invention, the right information can be delivered to the right person at the right time. With embodiments of the present invention, the information can come from internal and external sources. The information can also be cleansed, integrated and placed in the right business context and also be customized to meet an individual's particular needs. Embodiments of the present invention also allow information to be delivered proactively (i.e., "pushed").

Figure 2:
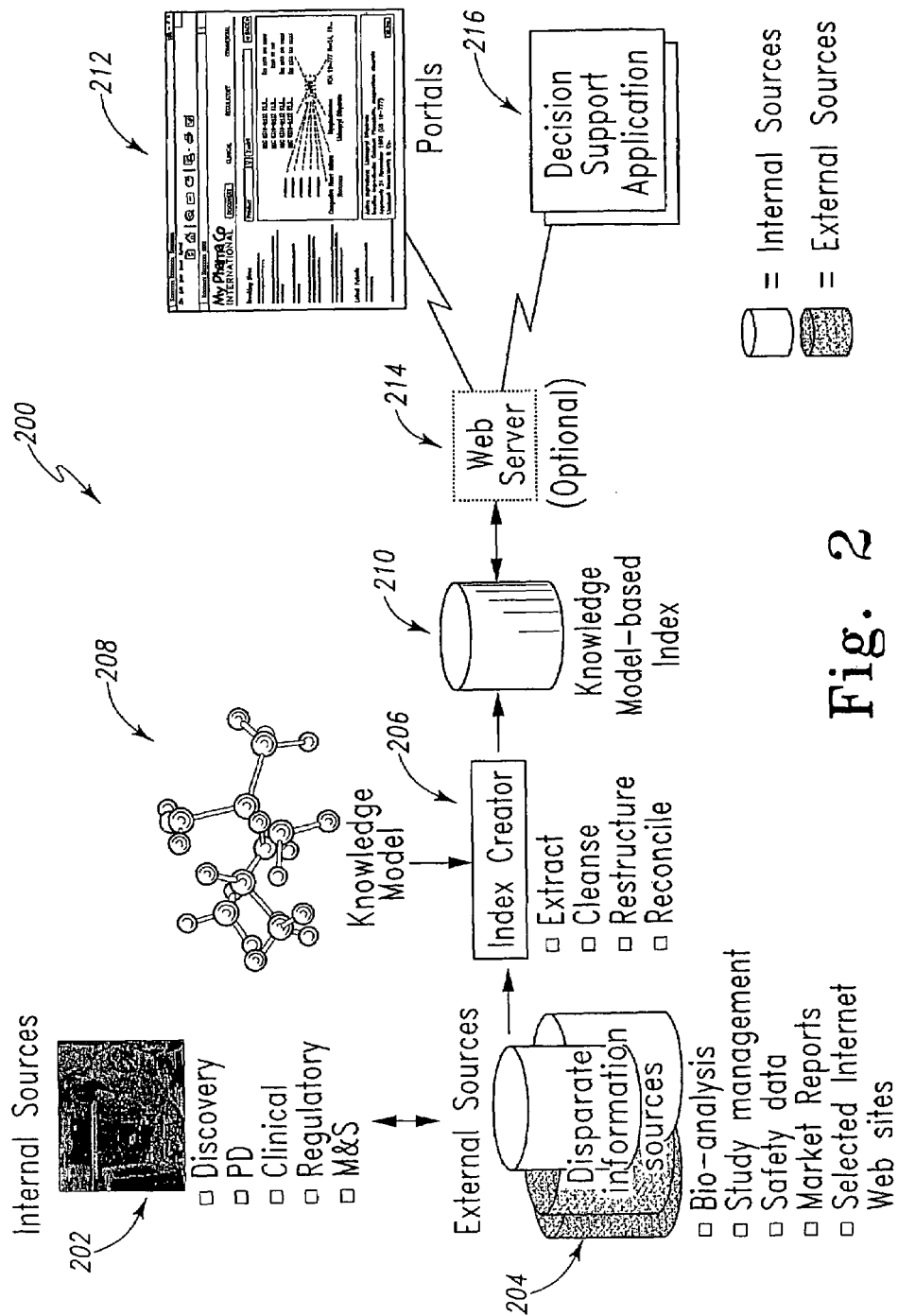
FIG. 2 is a schematic diagram of a knowledgebase framework in accordance with an embodiment of the present invention.

One aspect of the present invention to help facilitate efficient collaboration by helping to allow the sharing of information with other team members and by providing a medium to communicate a set of well understood processes. FIG. 2 is a schematic diagram of a knowledgebase framework 200 in accordance with an embodiment of the present invention. With such a knowledgebase framework, a wide variety of information sources may be extracted, cleansed and structured based on a knowledge model to create a highly customized index that can be accessed and browsed by a user.

In closer detail, information may be contained in a plurality of internal sources 202 and external sources 204. An internal source 202 of information is typically an information source that is an under the control of entity that employs the user and whose information maybe proprietary to the entity. Internal sources of information may include, for example: discovery information, PD information, clinical information, regulatory information, and M&S infonnation. An external source 204 of information is typically an information source that is not under the control of entity that employs the user. An external source may typically be accessible utilizing a wide area network such as the Internet and World Wide Web. External sources may include for example: bio-analysis information, study management information, safety data information, market report information, and Internet websites including government, public, and subscription based websites.

The knowledgebase framework may also include an index creator 206 which is connected to the internal and external sources 202, 204 by a network. The index creator 206 may also include or have access to a knowledgebase model 208. Utilizing the knowledgebase model 208, the index creator 206 may extract a wide variety information from the internal and external sources 202, 204, cleanse the extracted information, restructure the extracted information and then reconcile the extracted information into a knowledge model-based index.

The knowledgebase framework 200 may also include an index database 210 coupled to the index creator 206 for storing the knowledge model-based index created by the index creator 206. Users may then access the knowledge model-based index stored in the database 210 from a browser/portal 212 utilizing the network. As an option, the knowledgebase framework may also include a web server 214 or other similar type of computer for interfacing the browser/portal 212 with the database 210.

Additionally, the knowledgebase framework may include a decision support application 216 for helping a user determine what is the right information for the user and help the user receive the right information at the right time for the user. The decision support application 216 (in combination with the browser/portal 212) provides the user with the capability to browse and navigate through an integrated web of knowledge regardless the location of the knowledge sources.

The decision support application 216 also allows the user to access internal and external information. The decision support application 216 may also be used to provide a user with information tailored for a specific process such as, for example, a drug discovery. The decision support application 216 may further be used to help deliver the right information to the user by allowing them to monitor internal and external events at a wide range of granularity.

Figure 3:
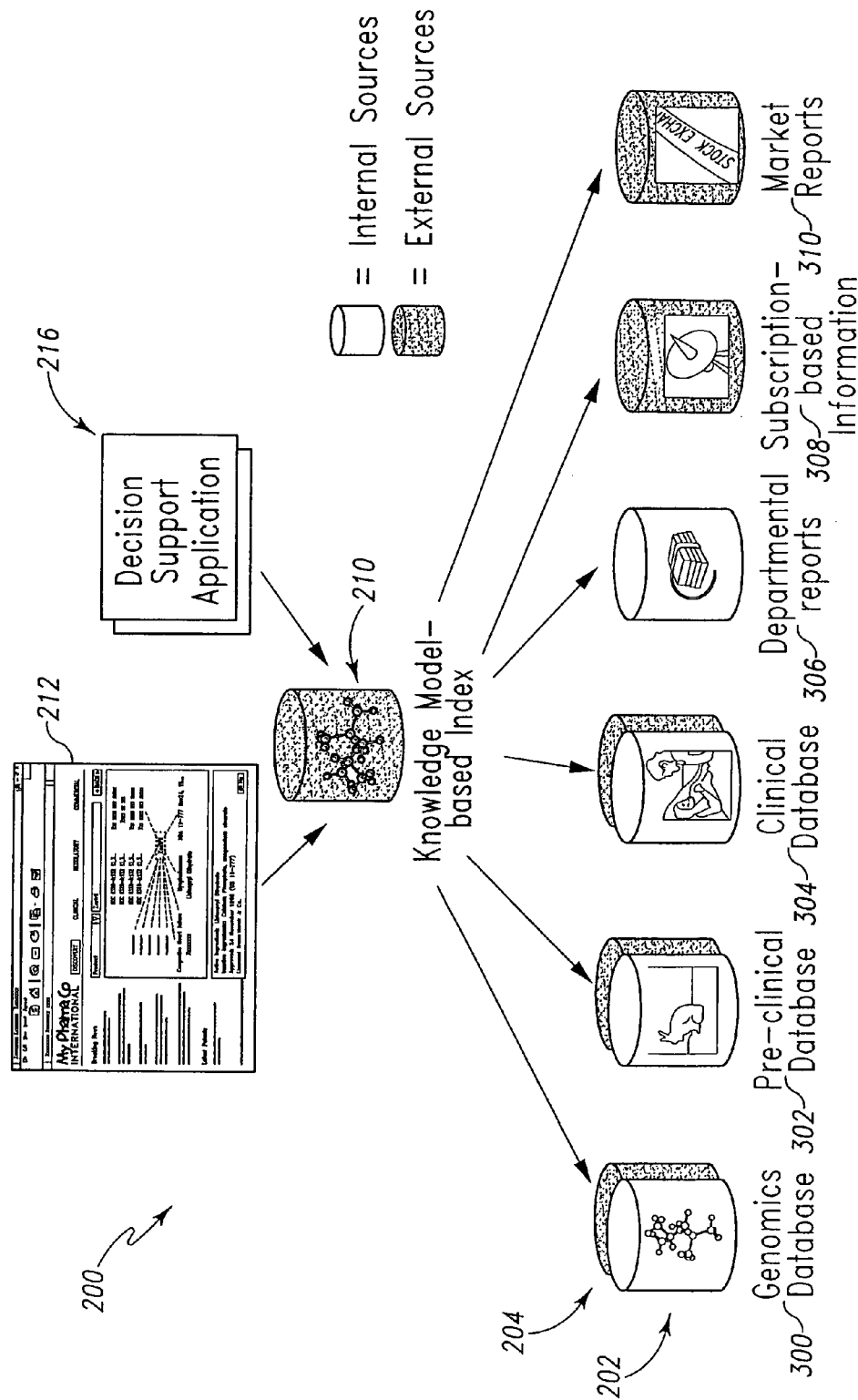
FIG. 3 is a schematic diagram of the knowledgebase framework illustrating how the index may be used as a user's primary gateway to a wide variety of information sources in accordance with an embodiment of the present invention.

FIG. 3 is a schematic diagram of the knowledgebase framework illustrating how the index may be used as a user's primary gateway to a wide variety of information sources 202, 204 in accordance with an embodiment of the present invention. From this index and with the assistance of the decision support application 216, a user has the ability to retrieve the original information source. Some illustrative information sources may include a genomics database 300, a pre-clinical database 302, a clinical database 304, a departmental reports database 306, a subscription based information database 308, and/or market report database 310. Some of these information sources may comprises exclusively internal or external sources while other information sources may comprise a combination of internal and external sources. In an illustrative example, as shown in FIG. 3, the departmental reports database 306 may exclusively comprise internal information sources, while the subscription based information database 308, and market report database 310 may comprise exclusively external information sources. Continuing with this illustrative example, the genomics database 300, the pre-clinical database 302, and the clinical database 304 may all comprise a combination of internal and external information sources.

Figure 4:
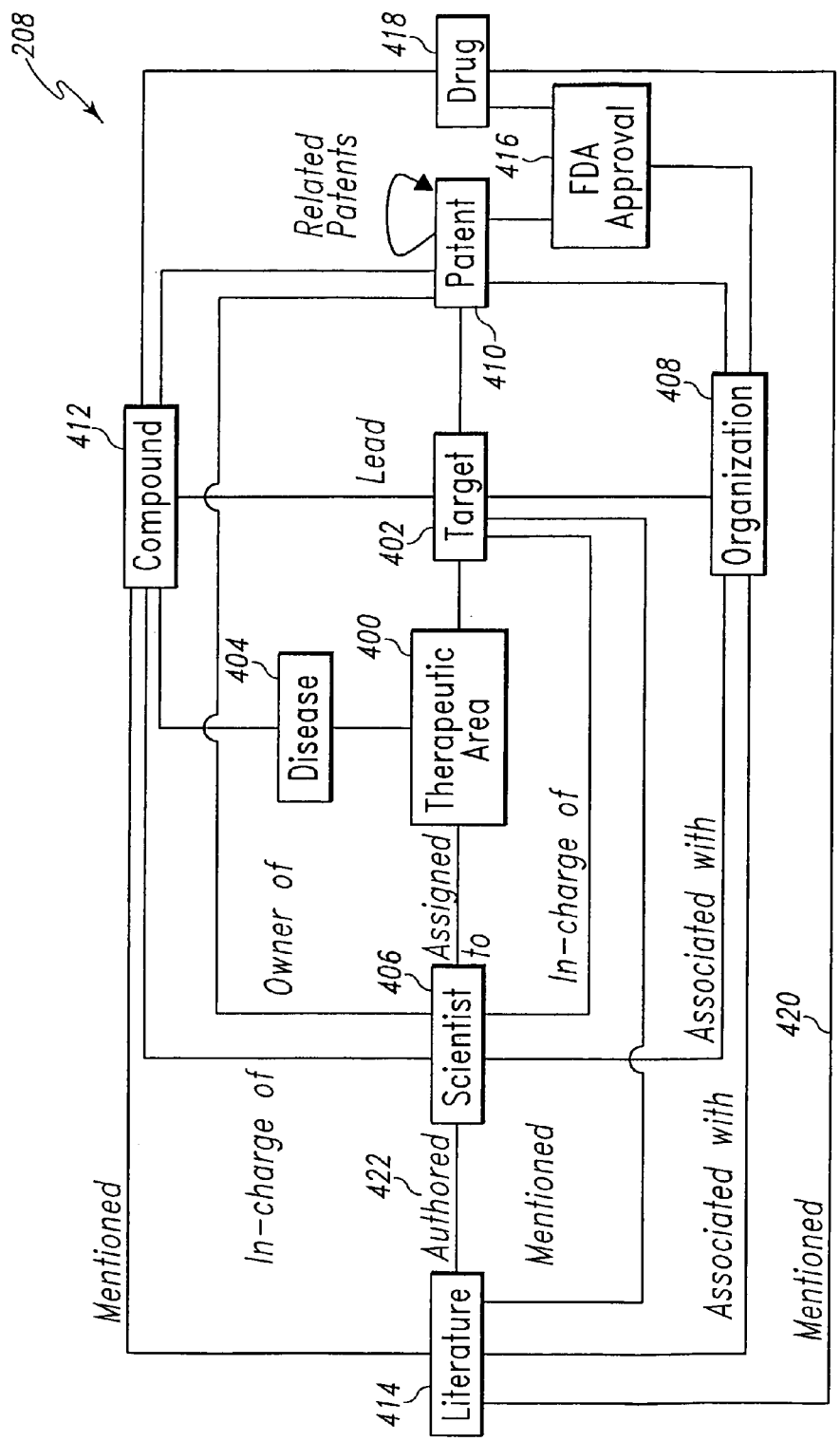
FIG. 4 is a schematic diagram of an illustrative knowledge model in accordance with an embodiment of the present invention.

FIG. 4 is a schematic diagram of an illustrative knowledge model 208 in accordance with an embodiment of the present invention. The knowledge model comprises a plurality of inter-related items. In an illustrative embodiment of the present invention, as illustrated in FIG. 4, the items of the knowledge model may include: a therapeutic area item 400, a target item 402, disease item 404, a scientist item 406, an organization item 408, a patent item 410, a compound item 412, a literature item 414, a FDA approval item 416, and a drug item 418.

The inter-relations between the various items of the knowledge model are illustrated in FIG. 4 by the plurality of connecting lines (e.g., connecting line 420)connecting each of the items to various other items. For example, the literature item 414 is directly related with the target item 402, the scientist item 406, the organization item 408, the compound item 412, and drug item 418. Also shown in FIG. 4 are the manner or type of relationship 422 provided by the associated connecting line. For example, the relationship between the literature item and the scientist item is the term "Authored."

The knowledge model also helps to provide an organizational structure to the index generated in the knowledgebase framework so that the items of the generated index are arranged according to the organization structure. In one embodiment of the present invention, the organizational structure of the generated index may be based on the inter-relations between the items of the knowledge model.

Figure 5:
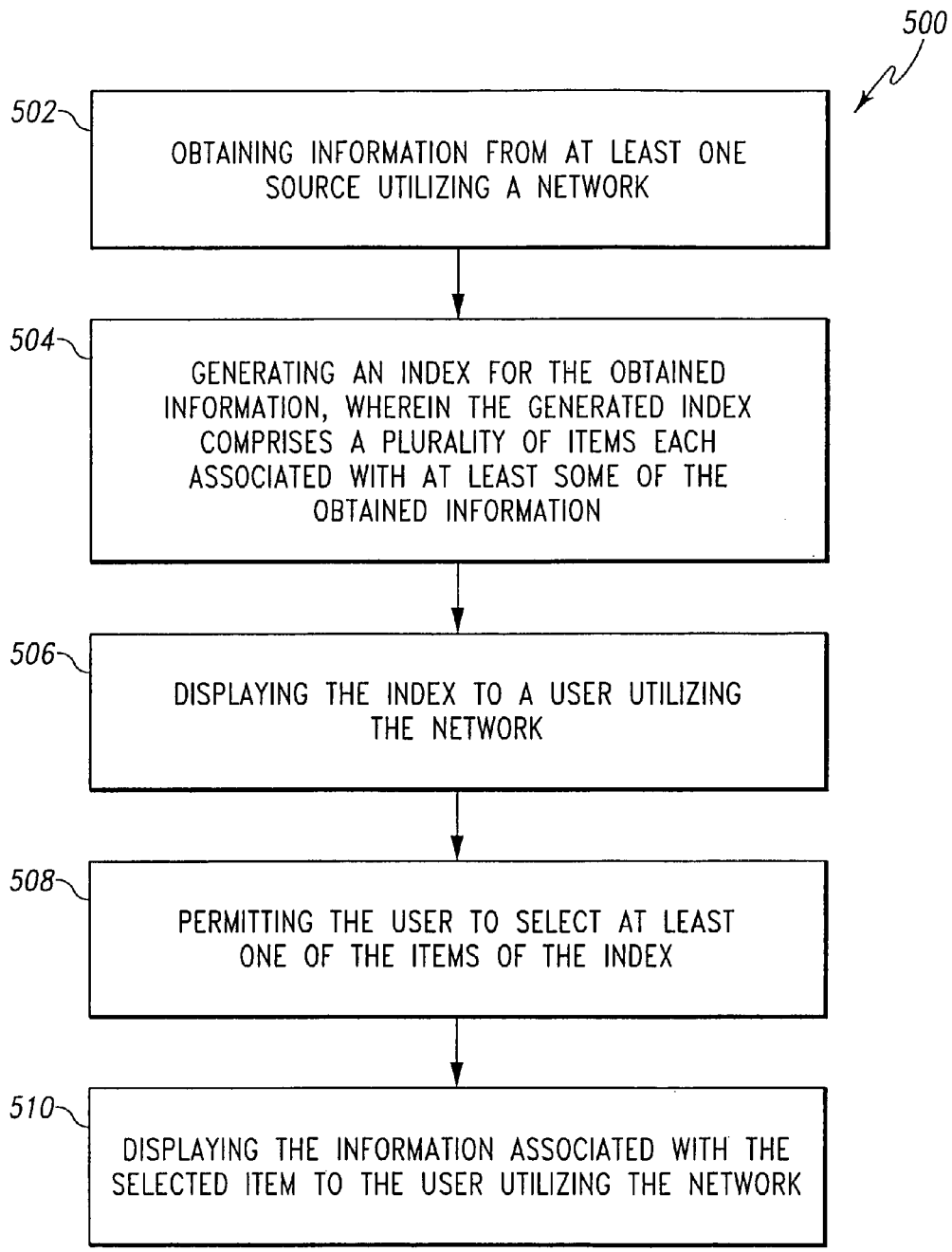
FIG. 5 illustrates a flowchart for a process for a knowledgebase framework in accordance with an embodiment of the present invention.

FIG. 5 illustrates a flowchart for a process 500 for a knowledgebase framework in accordance with an embodiment of the present invention. Information is obtained from at least one knowledge source utilizing a network in operation 502. Utilizing a knowledge model, an index is generated for the obtained information in operation 504. This generated index includes a plurality of items (or entries) each associated with at least some of the obtained information. The generated index may then be stored in an index database. Utilizing the network, the generated index is displayed to a user in operation 506. The user is permitted to select an least one of the items of the index in operation 508. After receipt of the selection by the user, the information associated with the selected item is then displayed to the user utilizing the network in operation 510.

In an aspect of the present invention, one of the knowledge sources from which information is obtained may be an internal source under the control of entity that employs the user and whose information therein may be proprietary to the entity. Some illustrative examples of internal sources include: a genomics database, a pre-clinical database, a clinical database, and/or a departmental reports database.

In another aspect of the present invention, one of the knowledge sources from which information is obtained may be an external source (e.g., a website) accessible utilizing a wide area network such as the Internet and World Wide Web. In general, the external sources may not typically be under the control of entity that employees the user. Some illustrative examples of external sources include subscription based information, and/or market reports.

In a further aspect of the present invention, the information obtained from the sources may include pharmaceutical information such as, for example, information relating to: a pharmaceutical therapeutic area, a pharmaceutical target, a pharmaceutical compound, a disease, a patent, the Federal Drug Administration (FDA) (such as information regarding FDA approval of a pharmaceutical), a person researching or working on a pharmaceutical, and/or pharmaceutical literature such as a periodical.

In an embodiment of the present invention, the network may be utilized to monitor one or more of the knowledge sources for updated information relating to one or more items in the index. In such an embodiment, when updated information is detected at one of the knowledge sources, a notice may be generated regarding the updated information. This notice may then be transmitted to the user utilizing the network to notify the user of the updated information. As an option, the user may be allowed to select the knowledge source(s) to be monitored for updates or other changes.

In another embodiment of the present invention, the user may be permitted to input a search term for searching the index utilizing the network. Upon receipt of the search term, the index may be searched for items associated with the search term. Items of the index associated with the input search term (i.e., that match the search term) may then be displayed to the user utilizing the network.

In one aspect of the present invention, the items of the index may be organized and displayed in some sort of a hierarchical format such as, for example, a hierarchical tree format. In yet a further aspect of the present invention, displaying of the information associated with the selected item (or entry) to the user may also include utilizing the network to retrieve the associated information from the knowledgebase source (such as a website) from which the associated information was obtained. In even another aspect of the present invention, the network may be capable of communicating using TCP/IP protocol.

Figure 6:
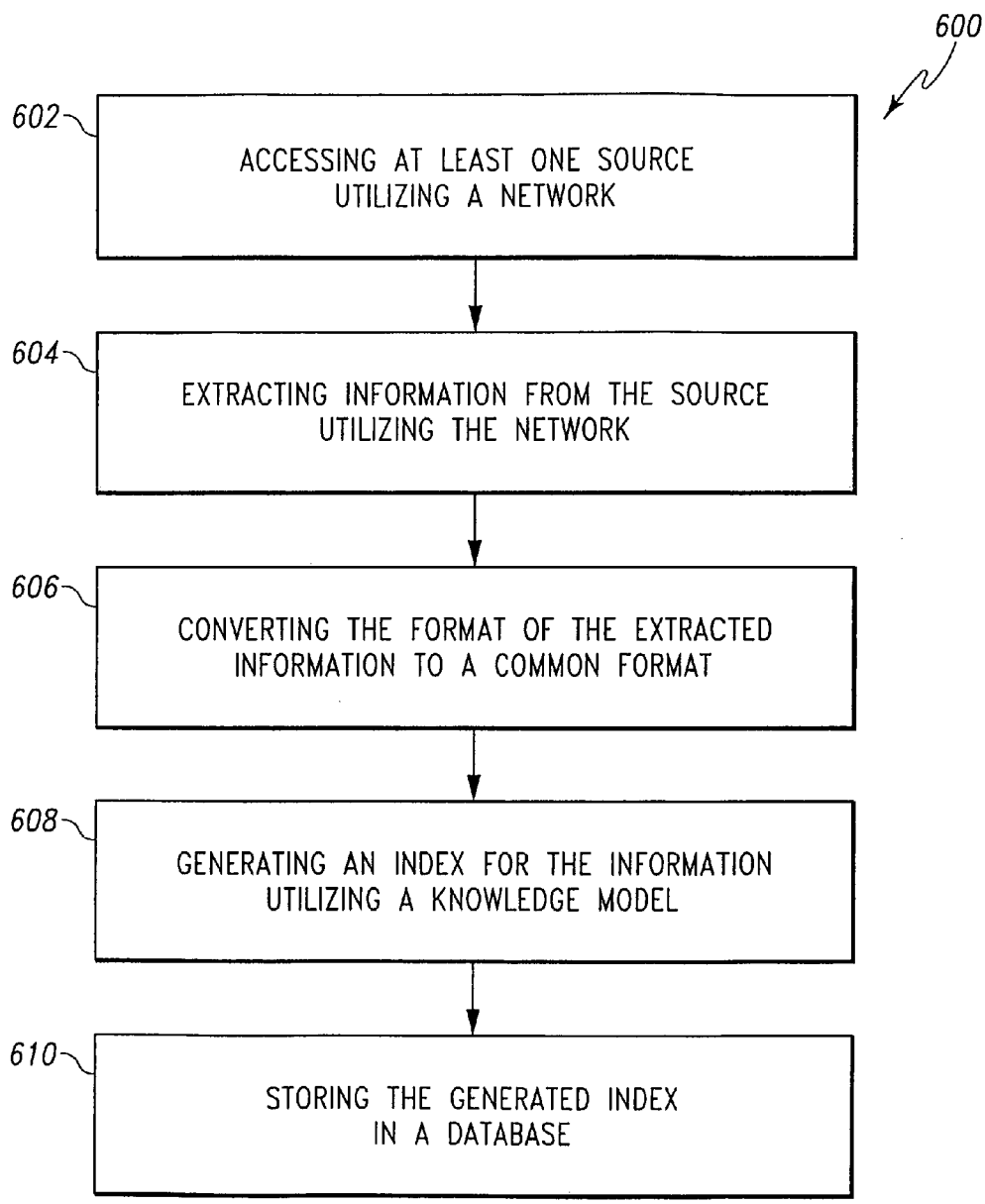
FIG. 6 illustrates a flowchart for a process for a knowledge model in accordance with an embodiment of the present invention.

FIG. 6 illustrates a flowchart for a process 600 for a knowledge model in accordance with an embodiment of the present invention. A network is utilized to access or one or more knowledge sources in operation 602. Information from the knowledge source is then extracted utilizing the network in operation 604. The extracted information may have its own formatting. The format of the extracted information is converted in operation 606 into a common or standardized format (i.e., cleansing and restructuring). An index is generated for the standardized extracted information utilizing a knowledge model in operation 608. The generated index is then stored in an index database in operation 610.

In one aspect of the present invention, the knowledge model may include a plurality of inter-associated or inter-related items. In such an aspect, generation of the index may include associating the extracted information with one or more of the items of the model, and then mapping the extracted information to the associated item. In this manner, when the index is displayed to a user, selection of the item by a user links the user to the associated information and the source of the information. As an option, the items of the knowledge model may include a therapeutic area item, a target item, disease item, a scientist item, an organization item, a patent item, a compound item, a literature item, a FDA approval item, and/or a drug item.

In even another aspect of the present invention, the knowledge model may also provide an organizational structure to the generated index so that the items of the generated index are arranged according to the organization structure. As an illustrative example, the organizational structure may be a hierarchical tree of the items. In a further aspect of the present invention, the extracted information may include pharmaceutical information. In another aspect of the present invention, the knowledge sources may include one or more an internal knowledge sources, and/or an external knowledge sources. In yet still another aspect of the present invention, the network may be capable of communicating using TCP/IP protocol.

In an embodiment of the present invention, a user may be permitted to access the database utilizing the network to retrieve the stored index. In another embodiment of the present invention, a query may be received utilizing the network whereupon, the index may be searched for information matching the query to thereby permit retrieval of the matching information utilizing the network.

In one embodiment of the present invention, the knowledgebase framework 200 may be used to help a user learn about a field and/or catch up on new developments in this field. In an embodiment of the present invention, a user may be able to use the knowledgebase framework 200 to find people who are involved in the area being studied and their background, previous research work done in the area (which in an illustrative embodiment may include a list of targets, compounds and drugs), and obtain research reports relating to the area being studied. Also, the user may utilize the knowledgebase framework 200 to find information from external sources such as, for example: recent patents, targets, compounds, and drugs relating to the area being studied, as well the people (such as scientists) who are actively working in this field or area of study.

Figure 7:
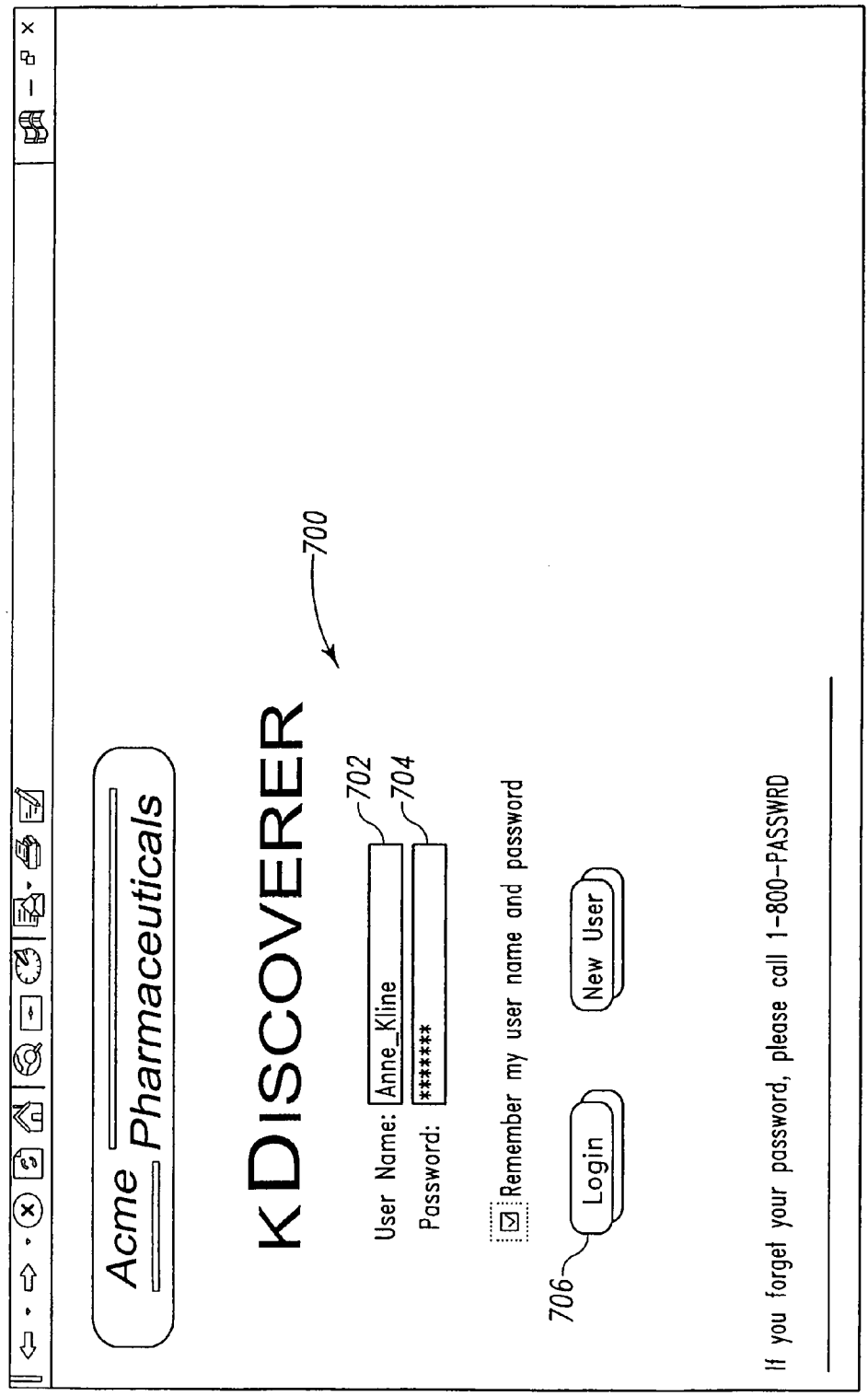
FIG. 7 is a schematic illustration of a log in frame for permitting a user to log into the knowledgebase framework utilizing a network in accordance with an embodiment of the present invention.

FIG. 7 is a schematic illustration of a log in frame 700 for permitting a user to log into the knowledgebase framework utilizing a network in accordance with an embodiment of the present invention. In one aspect of the present invention, the log in frame 700 may include a user name field 702 for permitting a user to enter a user name associated therewith, a password field 704 for permitting the user to enter a password associated with the user and the user name, and a selectable log in button 706 for permitting the user to log into the knowledgebase framework upon selection thereof.

Figure 8:
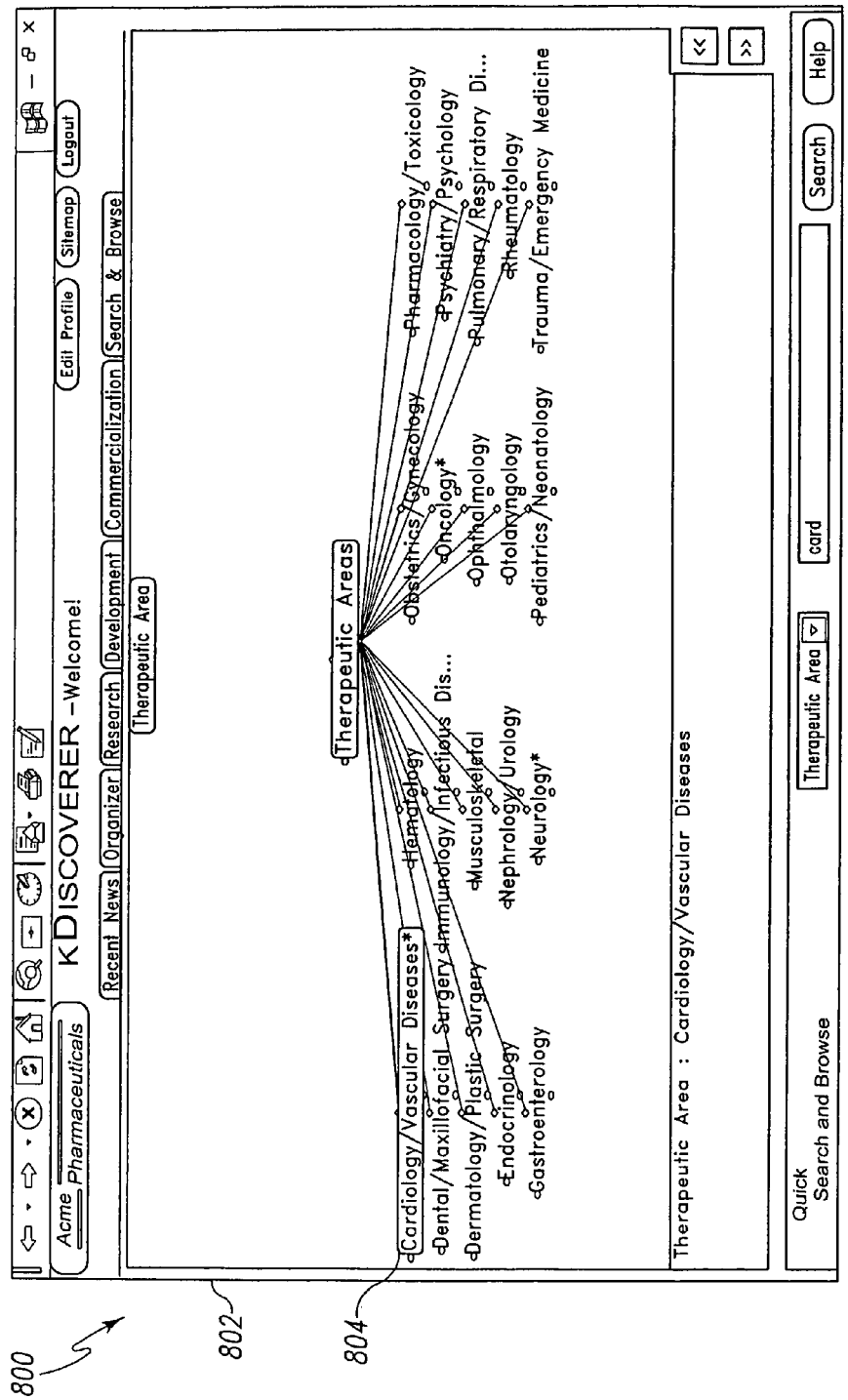
FIG. 8 is a schematic illustration of a search and browse frame of the decision support application for permitting a user browse the knowledge model-based index in accordance with an embodiment of the present invention.

Upon logging in, the user has access to the knowledgebase framework utilizing the decision support application 216 to obtain information in the area of their study. FIG. 8 is a schematic illustration of a search and browse frame 800 of the decision support application for permitting a user browse the knowledge model-based index in accordance with an embodiment of the present invention. Displayed in the search and browse frame 800 is a portion of the items of an illustrative knowledge model-based index. In this illustrative example, the items of the index being displayed comprises the therapeutic area items 802 of the illustrative index including, for example, a cardiology/vascular diseases 804 therapeutic area item. The items of the index displayed in the search and browse frame 800 also comprise selectable links which upon selection thereof by the user leads to the retrieval from the index database 210 and the displaying in the search and browse frame 800 of items of the knowledge model-based index related to the selection item.

Figure 9:
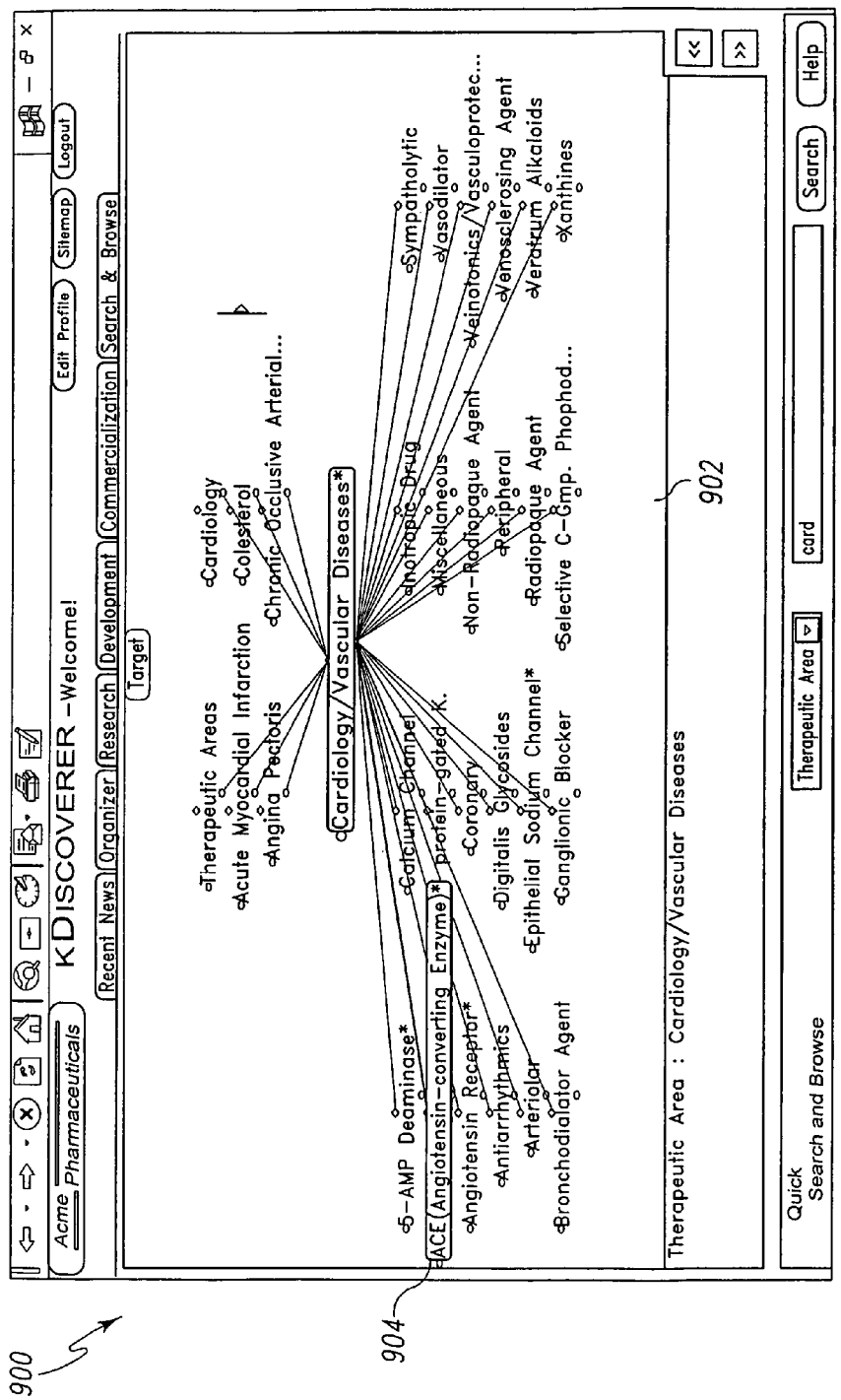
FIG. 9 is a schematic illustration of the items of the knowledge model-base index displayed in the search and browse frame upon selection of the cardiology/vascular diseases item in FIG. 8 in accordance with an embodiment of the present invention.

FIG. 9 is a schematic illustration of the items of the knowledge model-base index displayed in the search and browse frame 800 upon selection of the cardiology/vascular diseases item 804 in FIG. 8 in accordance with an embodiment of the present invention. These items also comprise selectable links so that selection of one of them leads to the retrieving and display of other items of the index related to the selected item. Included in FIG. 9, are disease items 900 and biological target items 902 of the illustrative index related to the selected therapeutic target item 804. In an illustrative example, one of the biological target items of the index being displayed in FIG. 9 may include an ACE biological target item 904.

Figure 10:
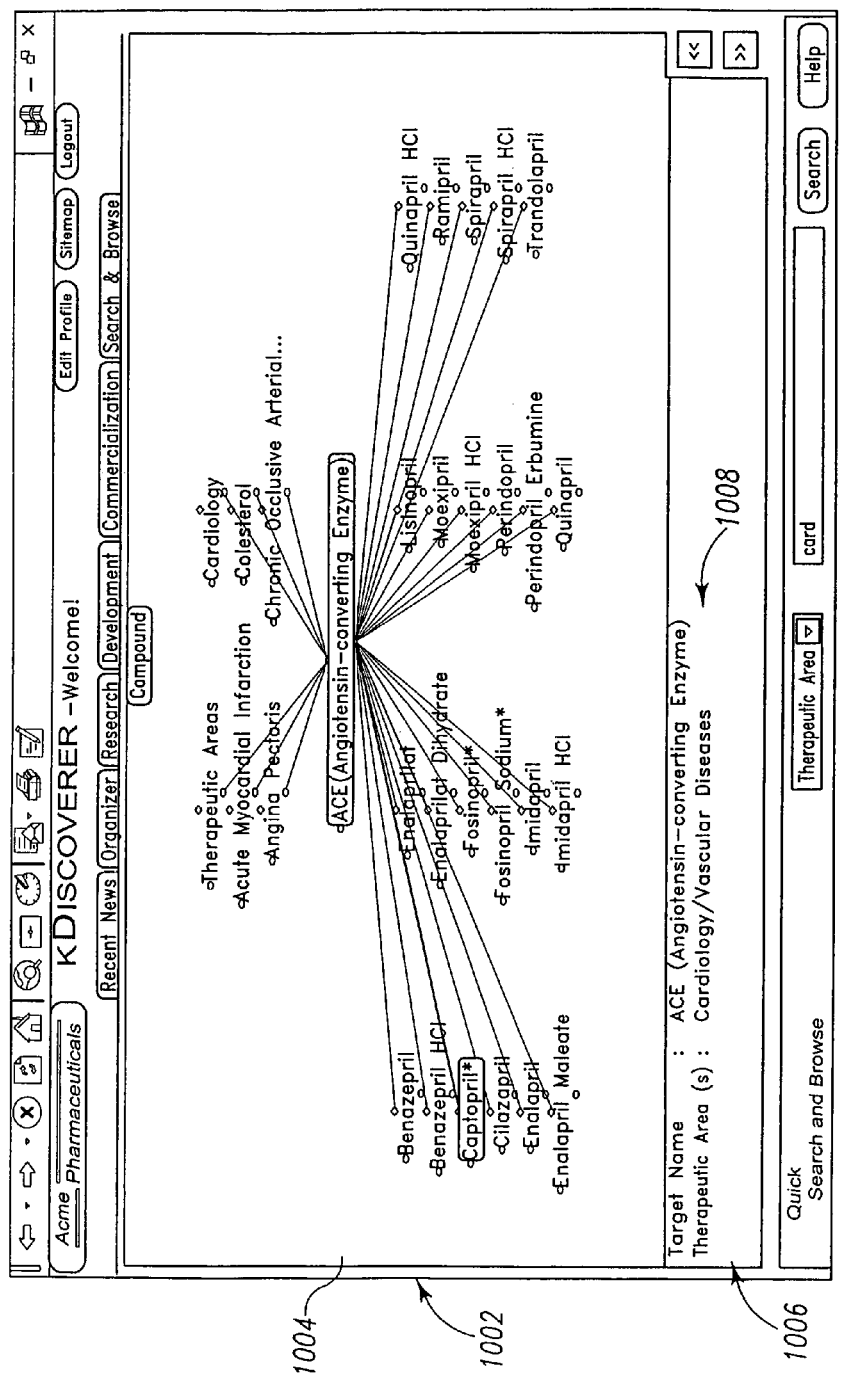
FIG. 10 is a schematic illustration of the items of the knowledge model-base index displayed in the search and browse frame upon selection of the ACE biological target item in FIG. 9 in accordance with an embodiment of the present invention.

FIG. 10 is a schematic illustration of the items of the knowledge model-base index displayed in the search and browse frame 800 upon selection of the ACE biological target item 904 in FIG. 9 in accordance with an embodiment of the present invention. These items also comprise selectable links so that selection of one of them leads to the retrieving and display of other items of the index related to the selected item. Included in FIG. 10, are component items 1002 of the illustrative index related to the selected item. In an illustrative example, one of the compound items of the index being displayed in FIG. 10 may include a captopril compound item 1004.

As illustrated in FIG. 10, in one aspect of the present invention, the search and browse frame 800 may include a display bar 1006 in which the hierarchy 1008 in the index of the selected item may be displayed. For example, in FIG. 10, the displayed hierarchy 1008 may comprises the target name ACE, and the therapeutic area cardiology/vascular.

Figure 11:
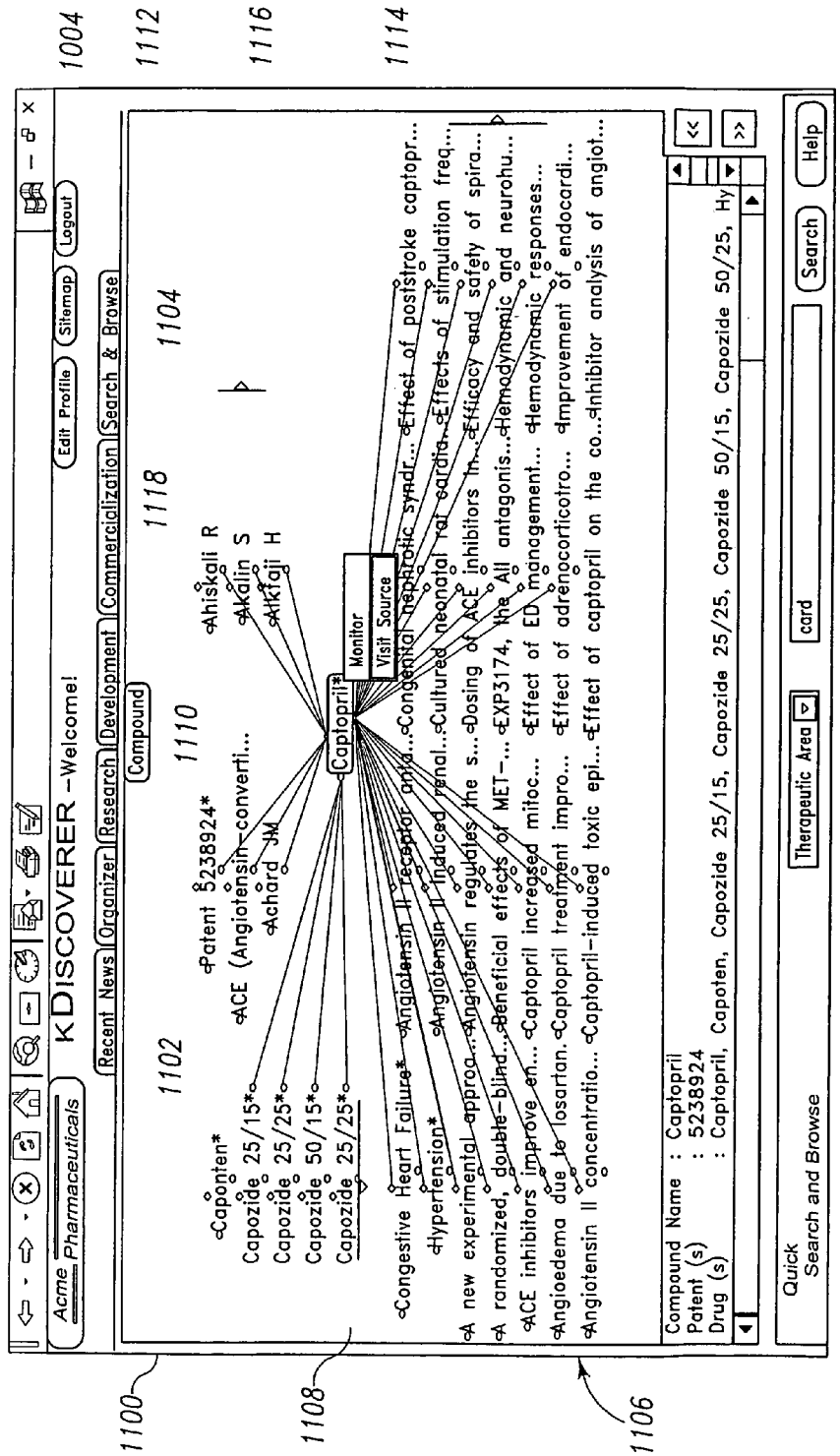
FIG. 11 is a schematic illustration of illustrative items of the knowledge model-base index displayed in the search and browse frame upon selection of the captopril compound item in accordance with an embodiment of the present invention.

FIG. 11 is a schematic illustration of illustrative items of the knowledge model-base index displayed in the search and browse frame 800 upon selection of the captopril compound item 1004 in accordance with an embodiment of the present invention. These items also comprise selectable links so that selection of one of them leads to the retrieving of information from the knowledgebase framework 200 and/or other items of the index related to the selected item. Included in FIG. 11, are illustrative items of the illustrative index related to the selected item (in this case captopril). In this illustrative example, the displayed related items include: related drug items 1100, related patent items 1102, related scientists and/or people items 1104, related literature items 1106, and related disease items 1108.

In one embodiment of the present invention, one of the items may be selected (such as by clicking the right button of a mouse when the mouse pointer is over the item, i.e., "right clicking") to display a pop-up menu 1110 which includes a monitor selection 1112 and a visit source selection 1114.

Figure 12:
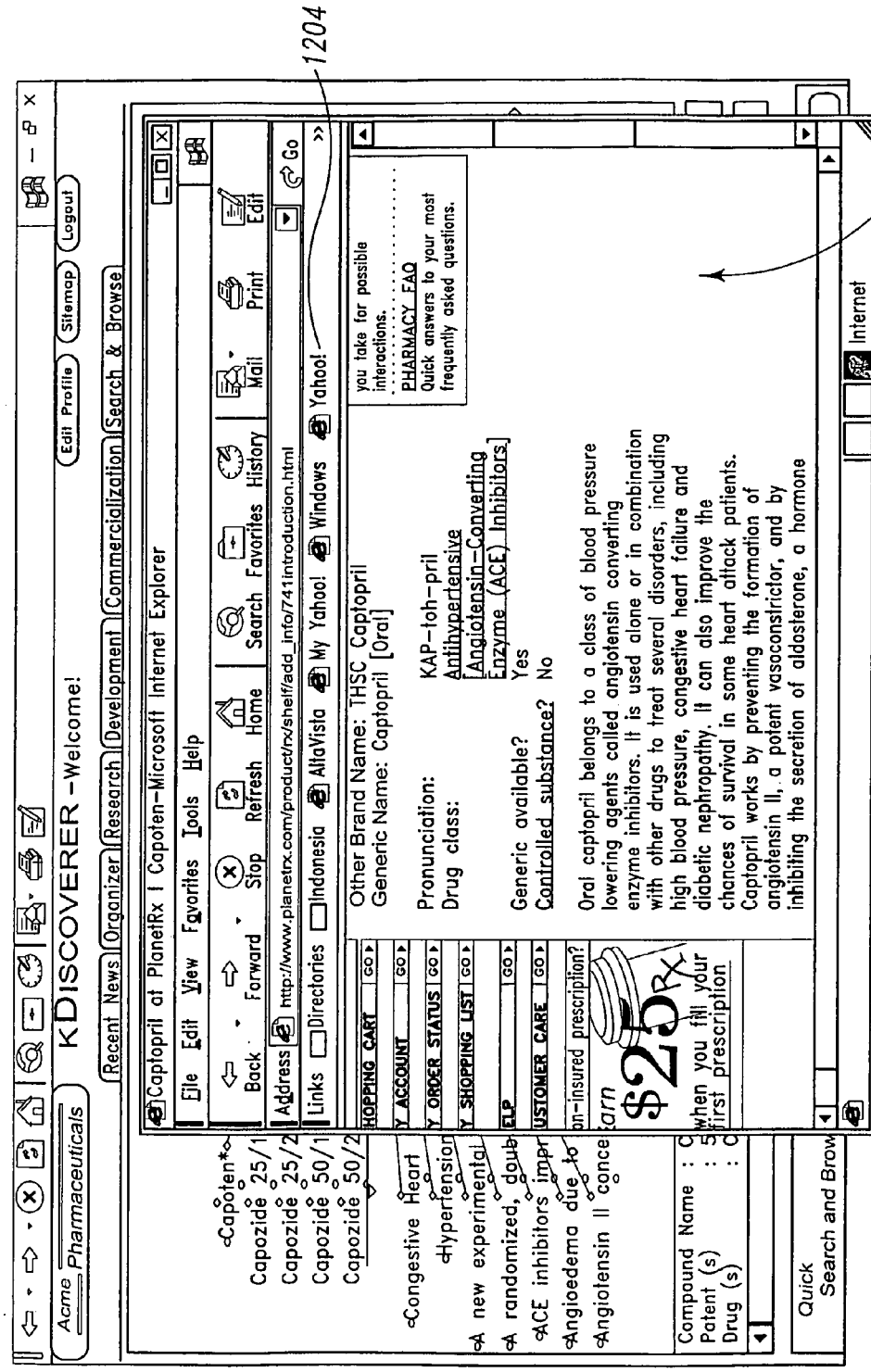
FIG. 12 is a schematic illustration of a browser frame which displays information from knowledge source relating to an item upon selection of the visit source selection in accordance with an embodiment of the present invention.
Figure 13:
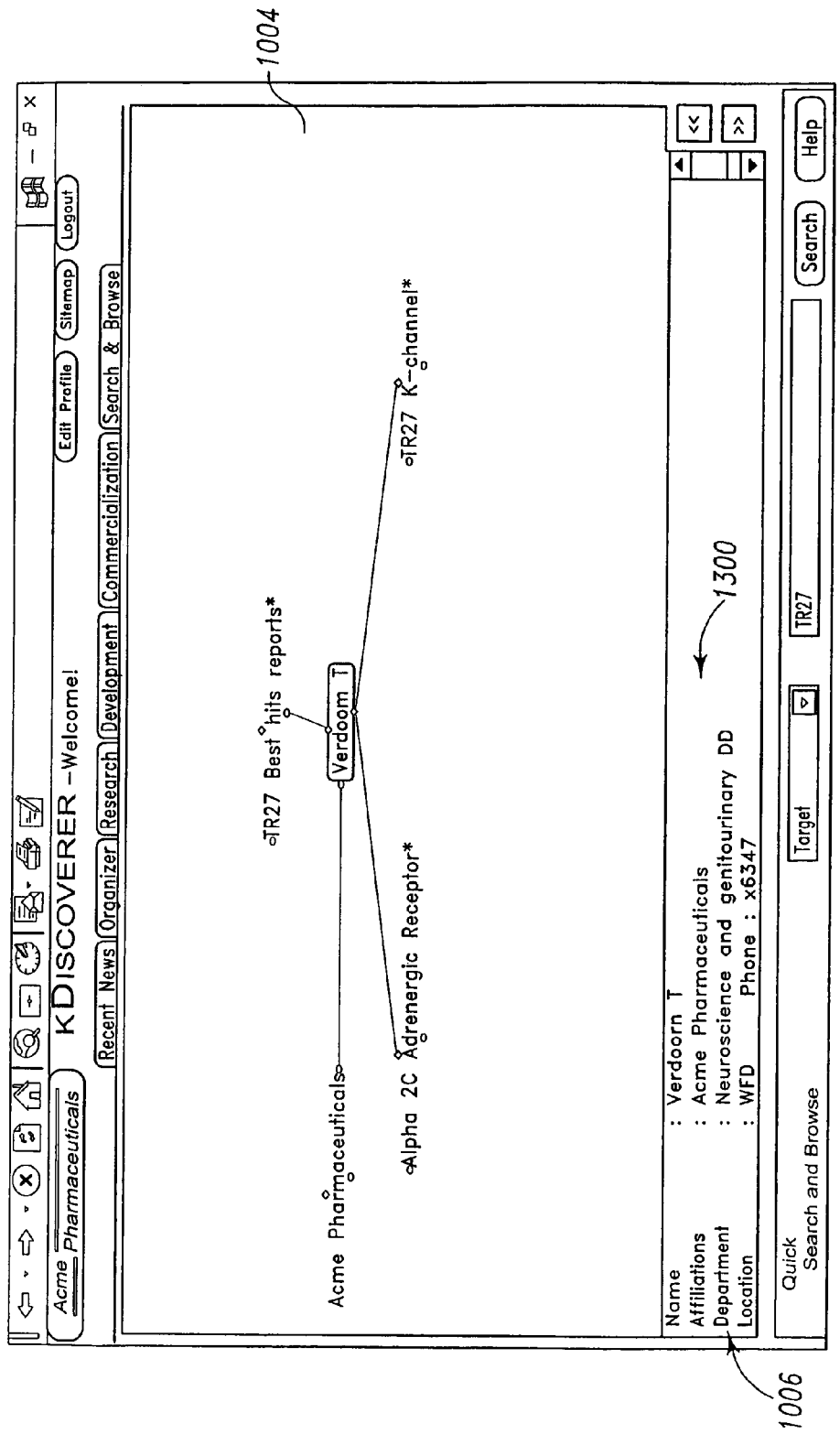
FIG. 13 is a schematic illustration of an exemplary display of the display bar upon selection of a scientist/person item in accordance with an embodiment of the present invention.

FIG. 12 is a schematic illustration of a browser frame 1200 which displays information 1202 from knowledge source relating to an item (in this example the captopril drug item 1004) upon selection of the visit source selection 1114 of FIG. 11 in accordance with an embodiment of the present invention. In the illustrative example illustrated in FIG. 12, the information 1202 displayed in the browser frame 1200 relates to the drug captopril and is obtained from an external source, in this case an illustrative website 1204 on the Internet FIG. 13 is a schematic illustration of an exemplary display of the display bar 1006 upon selection of a scientist/person item 1104 in accordance with an embodiment of the present invention. When a user selects a scientist/person item 1104, the knowledgebase framework may retrieve contact information for the scientist/person from a knowledge source and then display the retrieved contact information 1300 in the display bar 1006.

Figure 14:
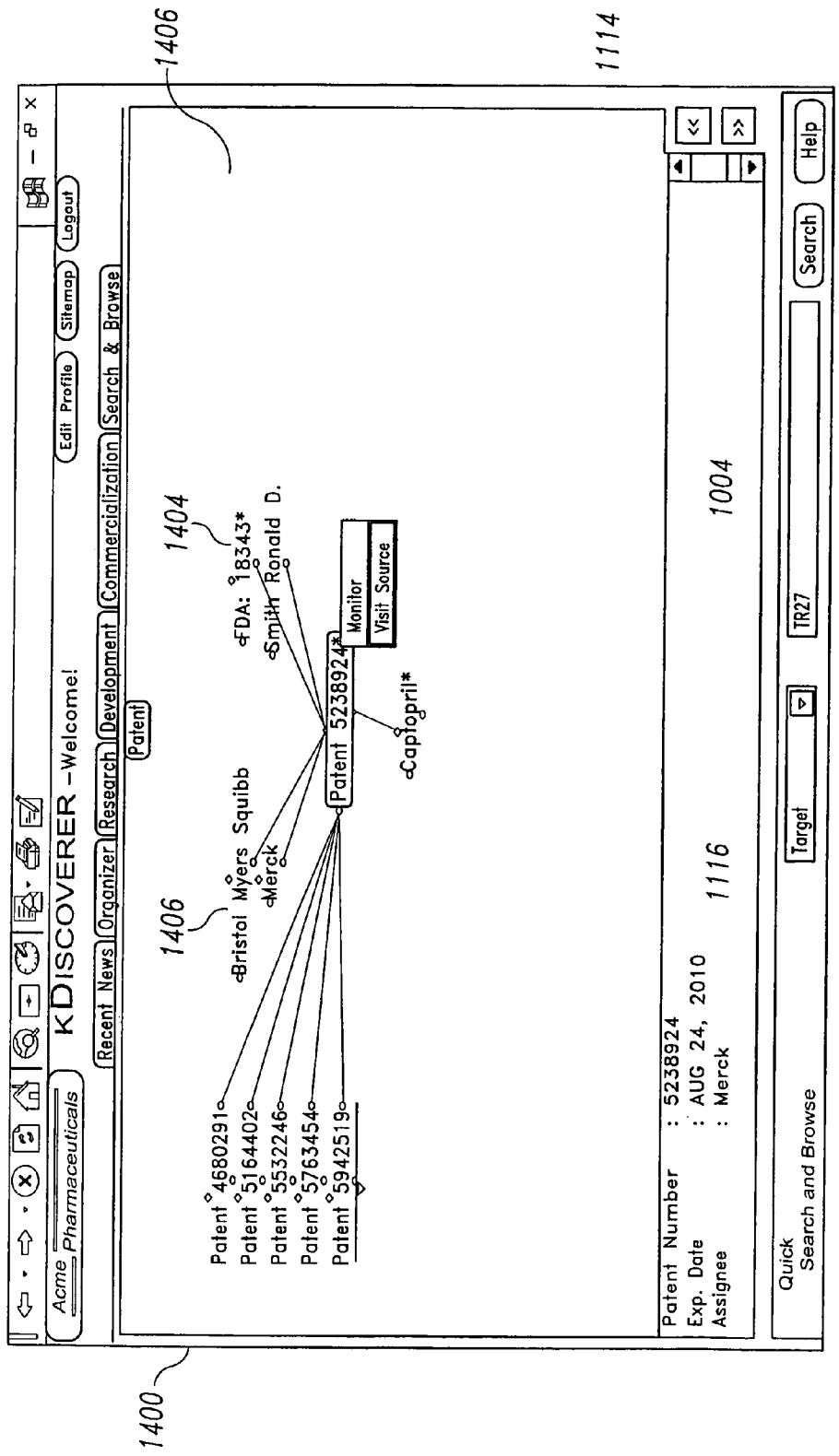
FIG. 14 is a schematic illustration of illustrative items of the knowledge model-base index displayed in the search and browse frame upon selection of a patent item in accordance with an embodiment of the present invention.

FIG. 14 is a schematic illustration of illustrative items of the knowledge model-base index displayed in the search and browse frame 800 upon selection of the patent item 1116 of FIG. 11 in accordance with an embodiment of the present invention. In an illustrative embodiment, the displayed items related to the selected patent item 1116 may include items for patent cited 1400 in the selected patent 1116, items for organizations 1402 related to the selected patent, items for FDA approval matters 1404 related to the selected patent, items for scientists and/or people 1406 associated with the selected patent, and items for compounds 1004 related to the selected patent.

Figure 15:
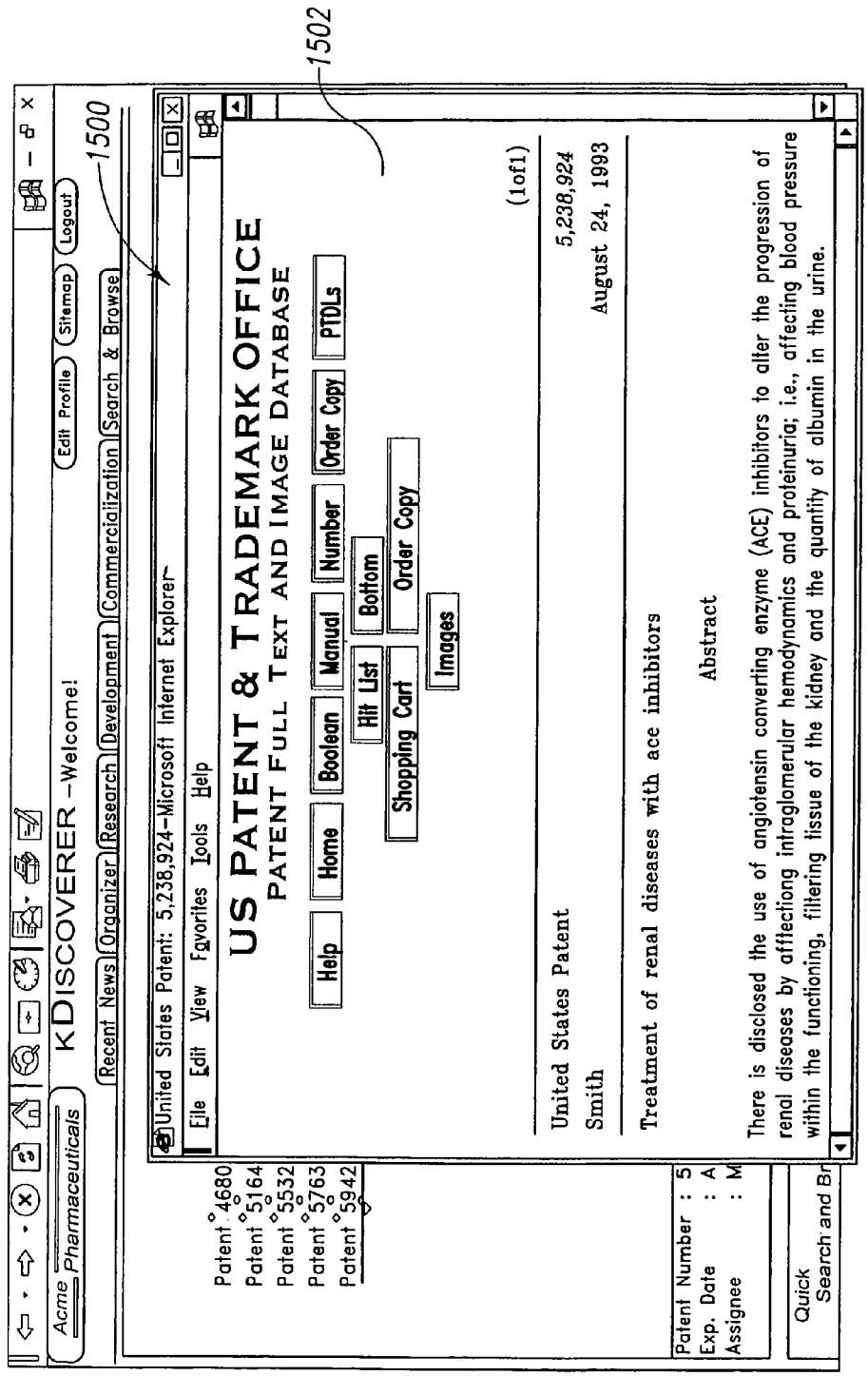
FIG. 15 is a schematic illustration of a browser frame which displays information from knowledge source relating to the selected patent item of FIG. 14 upon selection of the visit source selection in accordance with an embodiment of the present invention.

FIG. 15 is a schematic illustration of a browser frame 1500 which displays information 1502 from knowledge source relating to the selected patent item of FIG. 14 upon selection of the visit source selection 1114 of FIG. 14 in accordance with an embodiment of the present invention. In the illustrative example illustrated in FIG. 15, the information 1502 displayed in the browser frame 1500 relates to U.S. Pat. No. 5,238,924 and is obtained from an external source, in this case, the USPTO website's Patent Full Text and Image Database.

Utilizing the knowledgebase framework, a user may be able to monitor work done by others, such as scientists researching a particular area or field. This may be accomplished by selecting the monitor selection 1110 of a selected item, such as for example a scientist item 1118 displayed the search and browse frame of FIG. 11. In an embodiment of the present invention, any of the items of the index can be monitored for changes and updates to related information. For example, a user can select for monitoring an organization for any new publications, patents, drug applications, and recent news associated with the organization. In another illustrative example, a target item may be monitored for any new information related to monitored target.

Figure 16:
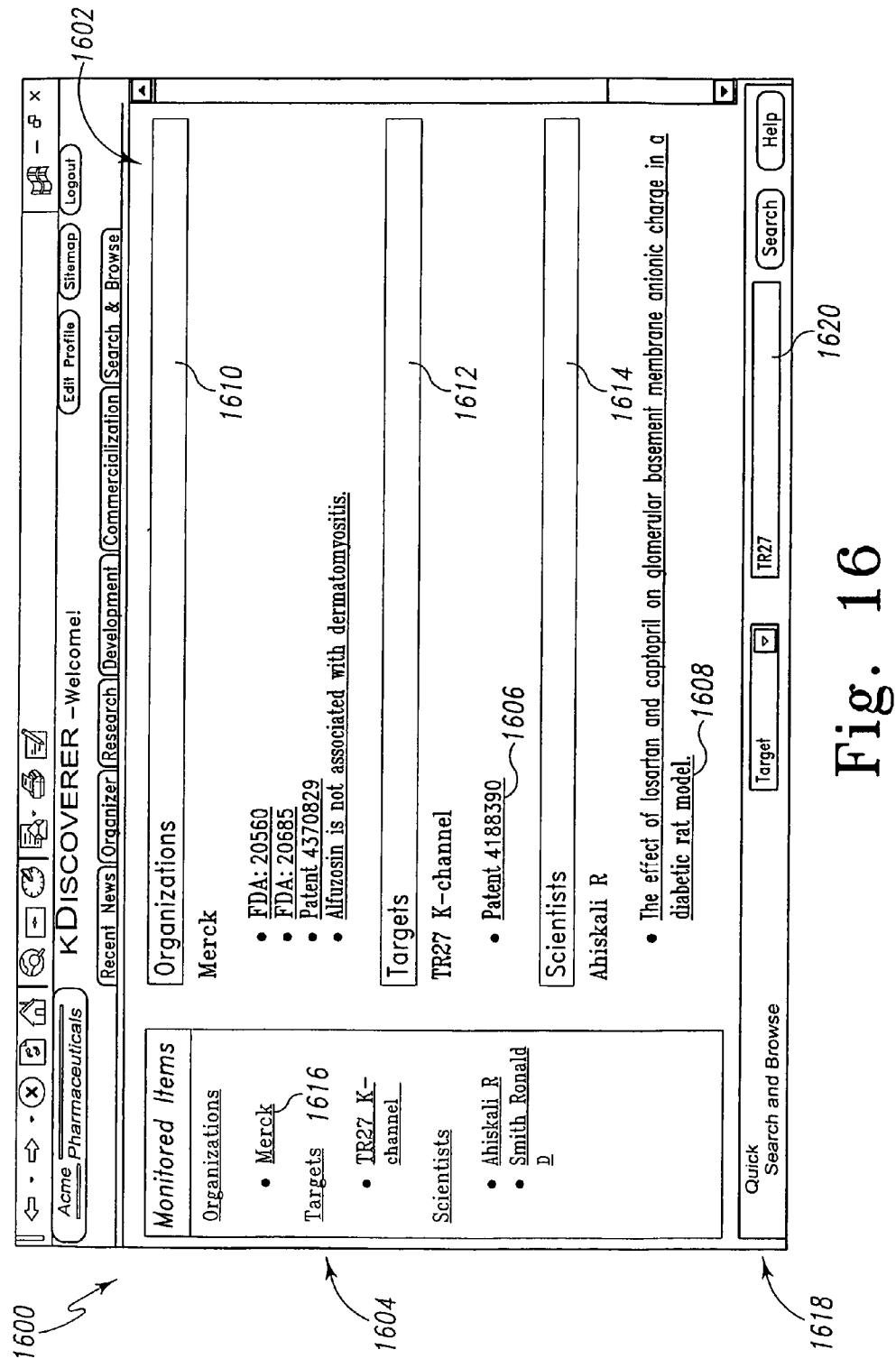
FIG. 16 illustrates a recent news frame that the user may access after logging on to the network in accordance with an embodiment of the present invention.

In one embodiment of the present invention, when the user logs into the decision support application 216, the user may see the most recent news about the scientists. FIG. 16 illustrates a recent news frame 1600 that the user may access after logging on to the network in accordance with an embodiment of the present invention. In one aspect of the present invention, a portion of the recent news frame 1600 may comprise a recent news portion 1602 and a monitored items portion 1604. In such an aspect, links 1606, 1608 to recently updated information may be displayed. In an illustrative example, selection of link 1606 (which is a link to a patent) may result in the retrieval and displaying of a browser frame similar to the browser frame of FIG. 15 to display information relating to the selected patent obtained from the USPTO website's Patent Full Text and Image Database.

With continuing reference to FIG. 16, the links may also comprise hypertext links and include textual summaries relating to information that was recently updated (see e.g., link 1608). As an option, these links may be organized by subjects or items such as for example, the items of the knowledge model 208 and displayed in corresponding subheadings. As illustrated in FIG. 16, some illustrative subheadings may include an organizations subheading 1610, a targets subheading 1612, and a scientist subheading 1614.

The monitored items portion 1604 may display a list of items 1616 selected by the user to be monitored by the knowledgebase framework. Like the recent news links 1606, the items 1616 in the monitored items portion 1604 may comprise links to access items in the knowledge model-based index.

Figure 17:
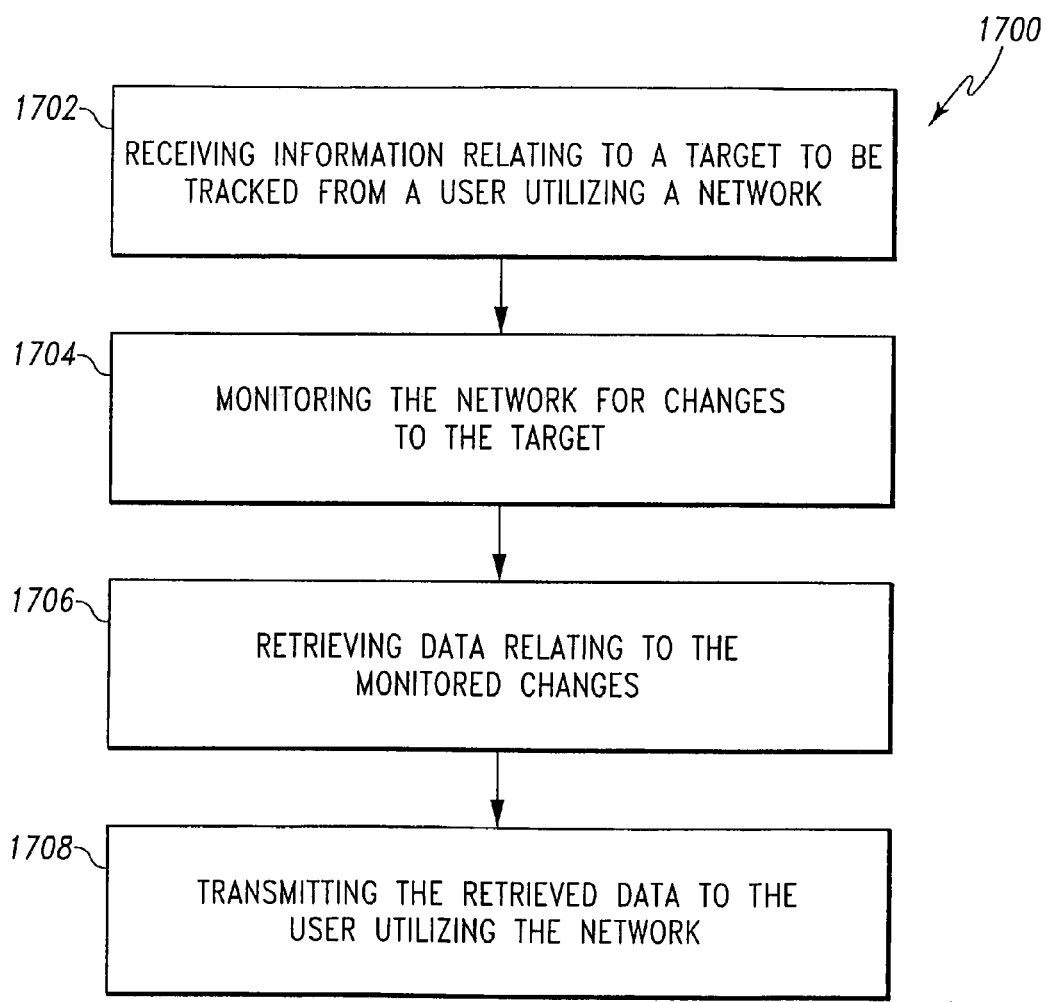
FIG. 17 illustrates a flowchart for a process for monitoring information in a knowledgebase framework in accordance with an embodiment of the present invention.

With continuing reference to FIG. 16, a search bar 1618 may also be displayed to the user. The search bar 1618 may include at least one field 1620 for the user to input a search term. Upon input, a search may be conducted by a search engine for items in the index related to the inputted term(s). Figure A FIG. 17 illustrates a flowchart for a process 1700 for monitoring information in a knowledgebase framework in accordance with an embodiment of the present invention. Utilizing a network, information is received from a user that relates to a target to be tracked in operation 1702. The network is monitored for changes or updates to the target 1704. When a change is monitored, data relating to the monitored changes is retrieved in operation 1706 and then transmitted to the user utilizing the network in operation 1708.

In one aspect of the present invention, the target may be an item of index displayed to the user utilizing the network. In another aspect of the present invention, the target may be: a publication (e.g., literature), a person (e.g., scientist), a therapeutic area, a disease, a biological target, an organization, a compound, a patent, FDA approval, and/or a drug.

In a further aspect of the present invention, a pharmaceutical database may be monitored for changes or updates relating to the target. In yet another aspect of the present invention, the network may comprise an intranet of an organization and the Internet.

In an embodiment of the present invention, the received information may be stored in memory. In another embodiment of the present invention, the retrieved data may be transmitted to the user after receipt of an indication that the user has logged on to the network. As an option to such an embodiment, the retrieved data may be automatically transmitted to the user after receipt of the indication that the user has logged on to the network.

In a further embodiment of the present invention, the user may be alerted that a change or update to the target has been monitored utilizing the network. In even another embodiment of the present invention, the user may be permitted to input a search term utilizing the network. In such an embodiment, items associated with the search term may be searched for upon receipt of the search term. Then those items which have been found to be associated with the inputted search term may be displayed to the user utilizing the network.

Figure 18A:
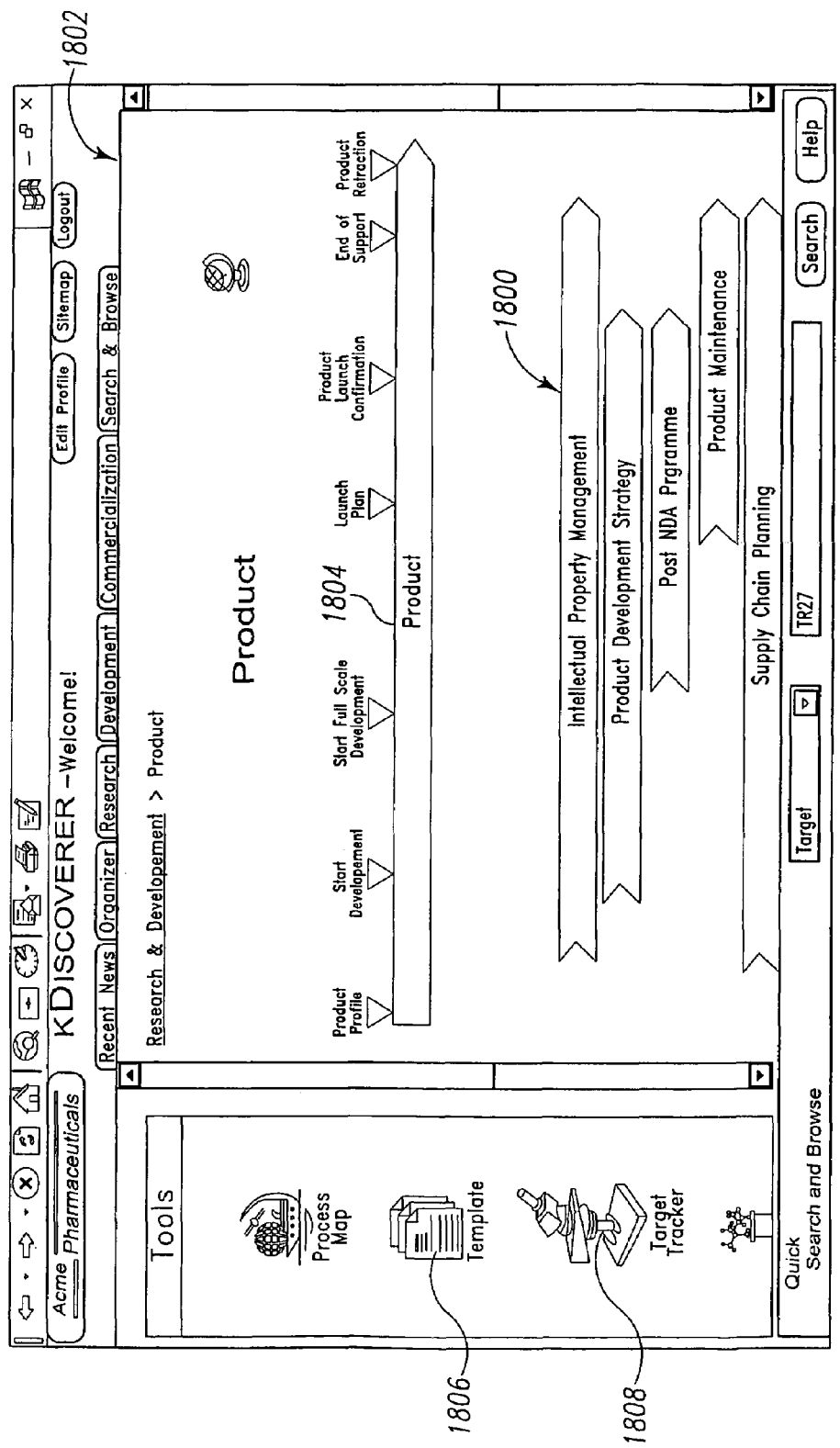
FIG. 18A is a schematic illustration of a process map displayed in a research frame for use in a knowledgebase framework in accordance with an embodiment of the present invention.

FIG. 18A is a schematic illustration of a process map 1800 displayed in a research frame 1802 for use in a knowledgebase framework in accordance with an embodiment of the present invention. With the research frame 1802, a user may be able to share a set of common processes and report templates with one or more other users to document their findings for further collaboration. The process map graphically depicts a timeline for one or more processes. In the illustrative example illustrated in FIG. 18A, the depicted process map 1800 may be for process for the development of a product 1804 in a pharmaceutical setting.

Figure 18B:
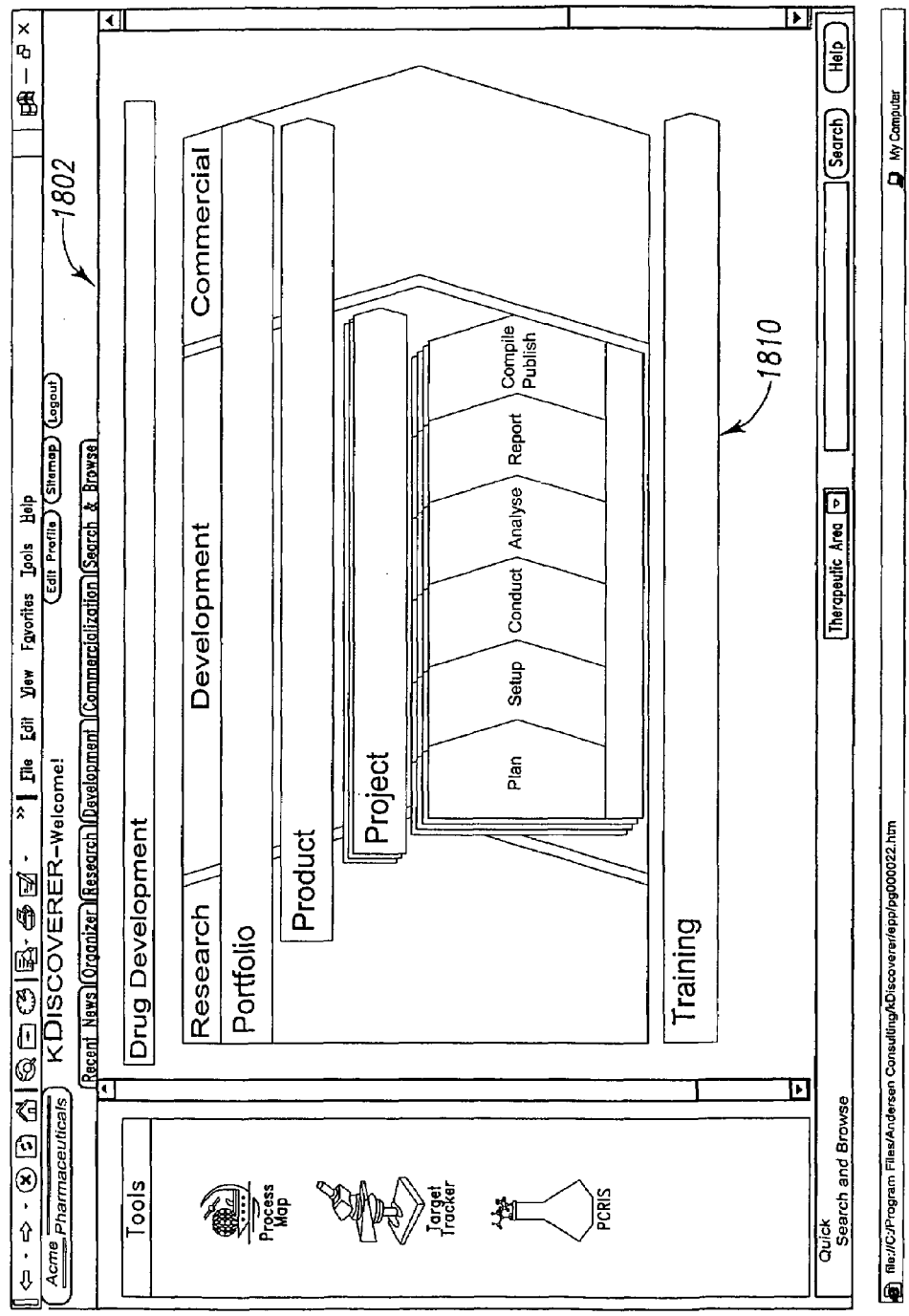
FIG. 18B is a schematic illustration of an illustrative template for a process map displayed in the research frame in accordance with an embodiment of the present invention.

The research frame 1802 may also include selectable links for accessing various tools for the research frame such as for example, templates 1806 and target tracking tools 1808. FIG. 18B is a schematic illustration of an illustrative template 1810 for a process map displayed in the research frame 1802 in accordance with an embodiment of the present invention.

Figure 18C:
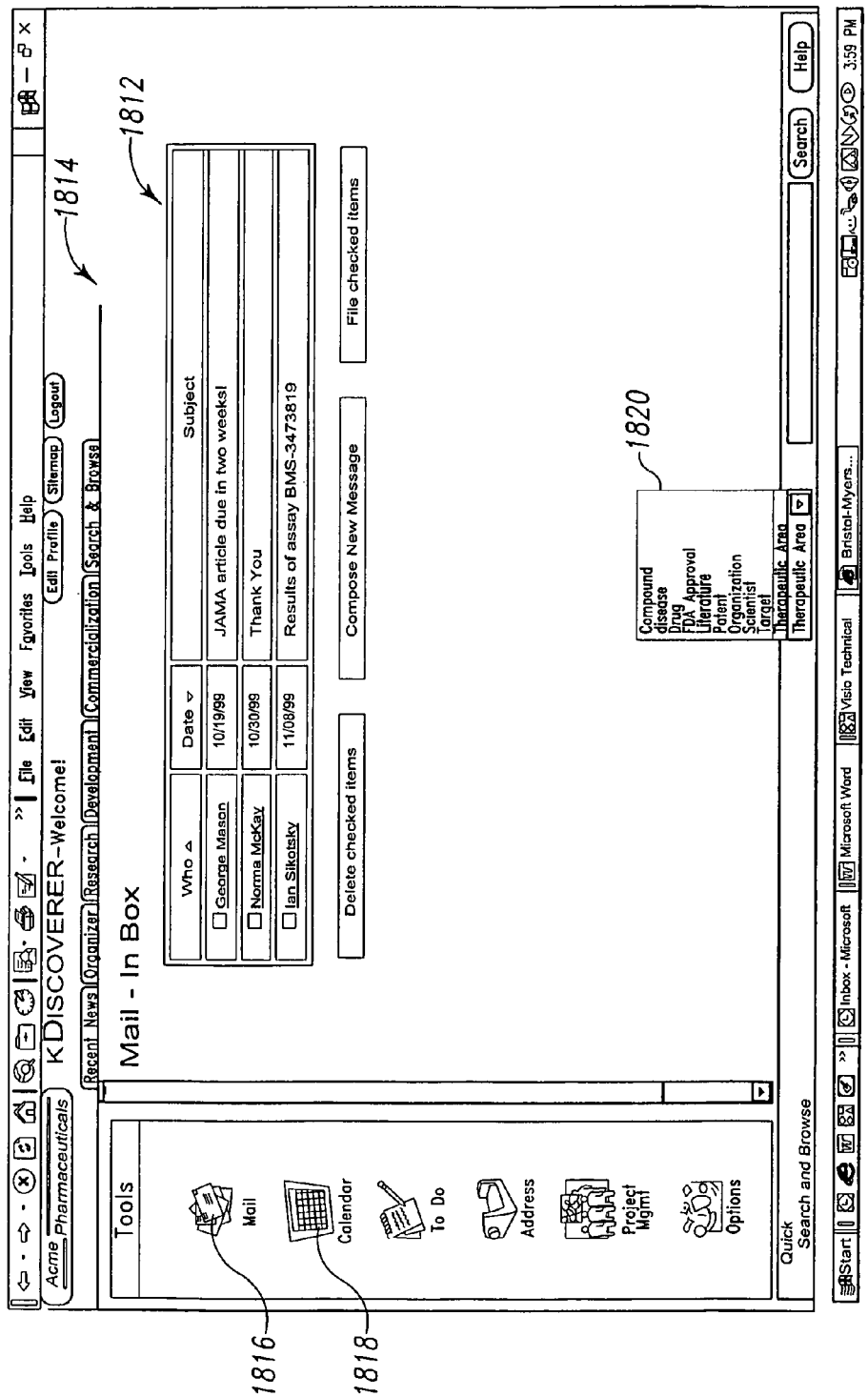
FIG. 18C illustrates an inbox for managing email messages displayed in an organizer frame for use in a knowledgebase framework in accordance with an embodiment of the present invention.

FIG. 18C illustrates an inbox 1812 for managing email messages displayed in an organizer frame 1814 for use in a knowledgebase framework in accordance with an embodiment of the present invention. The organizer frame may also include a plurality of tool links for accessing features of the organizer frame. Illustrative examples of tool links include a mail link 1816 for displaying the inbox upon selection thereof and a calendar link 1818. Also illustrated in FIG. 18C is a pull-down menu 1820 that may be included in the search bar 1618 to further narrow a search of terms input into the search bar.

Figure 18D:
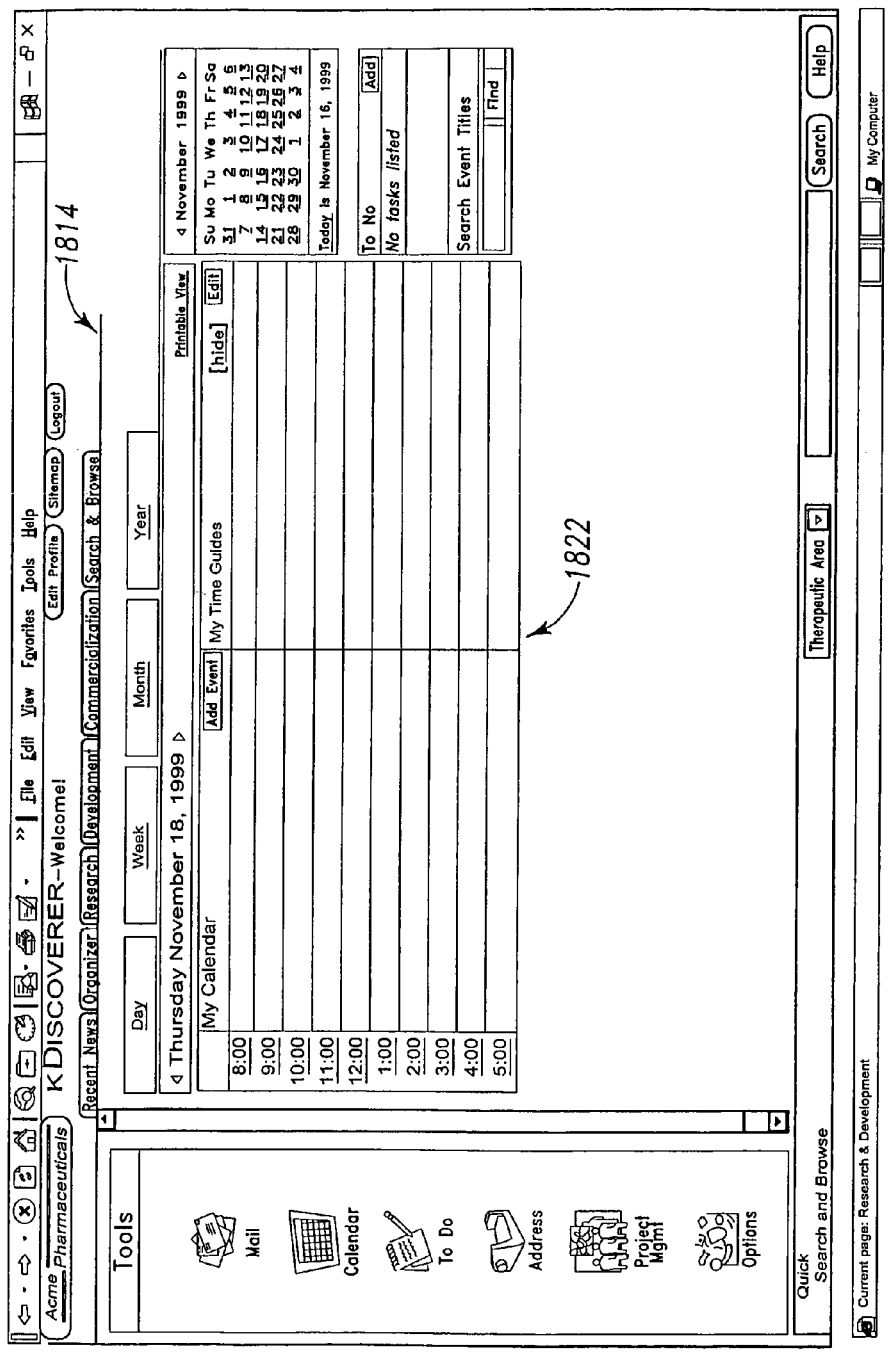
FIG. 18D illustrates a calendar for managing events and appointments of a user displayed in an organizer frame for use in a knowledgebase framework in accordance with an embodiment of the present invention.

FIG. 18D illustrates a calendar 1822 for managing events and appointments of a user displayed in an organizer frame 1814 for use in a knowledgebase framework in accordance with an embodiment of the present invention. The calendar 1822 may be displayed upon selection of the calendar link 1818 by a user.

The following example describes an illustrative scenario for utilizing the knowledgebase framework in accordance with an embodiment of the present invention.

EXAMPLE

Anne Kline, a senior biologist at Acme Pharmaceutical, has just transferred from the Oncology department to the Cardiovascular department. She has a reasonably strong background in Cardiovascular. Prior to joining Acme Pharmaceutical, she worked at the Imperial College School of Medicine's Cardiovascular department for a couple years. However, she has not been active in this area since she joined Acme Pharmaceutical 3 years ago. She needs to catch up with the new developments in this area—inside and outside Acme Pharmaceutical. Acme Pharmaceutical has just installed a knowledgebase framework. The knowledgebase framework allows Acme Pharmaceutical's scientists to search, browse and monitor internal and external information available to them. Anne accesses the knowledgebase framework from her computer desktop.

Anne accesses the knowledgebase framework from her computer desktop. She spends almost the entire day using the knowledgebase framework and at the end of the day she is able to find:

The people in Acme Pharmaceutical who are involved in the cardiovascular area and their background
Previous research work done within Acme Pharmaceutical (which includes a list of targets, compounds and drugs)
Internal research reports In addition, Anne also finds useful information from external sources such as recent:

Patents
Targets
Compounds
Drugs
as well the scientists who are actively working in this area In addition, Anne finds two scientists whose work seem to be relevant to her first assignment. She sets up her profile in the knowledgebase framework in such a way that it will monitor any future work done by these scientists. The next time Anne accesses the knowledgebase framework, she will see the most recent news about those two scientists. She also knows that Merck has been very active in the Cardiovascular area. She sets up the knowledgebase framework to monitor any new publications, patents, drug applications by Merck The next time Anne accesses the knowledgebase framework, she will see the most recent news about Merck.

Anne's first assignment is to investigate TR27 K-Channel as a potential target for hypertension treatment. She uses the knowledgebase framework to find out any previous work related TR27. She finds only one article that are somewhat relevant. Since she will be working on this target for awhile, she sets up the knowledgebase framework to monitor any new information related to TR27. One morning a couple days later, Anne turns on her computer and the knowledgebase framework informs her that Pfizer has filed a patent and this patent has cited TR27. Anne quickly browses through the patent. Luckily, the patent cited TR27 for a different reason.

Later on that day, the knowledgebase framework informs her that there is a newly released internal report that mentioned this particular target. This report was filed by the Neurology department, right after the High Throughput Screening was conducted on the target. She downloads the report and studies it carefully.

She launches Target DB, a tool that stores information of all targets investigated by Acme Pharmaceutical, from the knowledgebase framework to find out the details information about assay used for TR27. With help from the knowledgebase framework, Anne figures out the person involved with this target. She is able to contact one of that researcher for further information.

While her testing procedures will be different, Anne is able to use many parts of the results as a starting point. This encounter has saved her a few months of hard work. The two researchers are able to share a set of common processes and report templates to document their findings for further collaboration.

Figure 19:
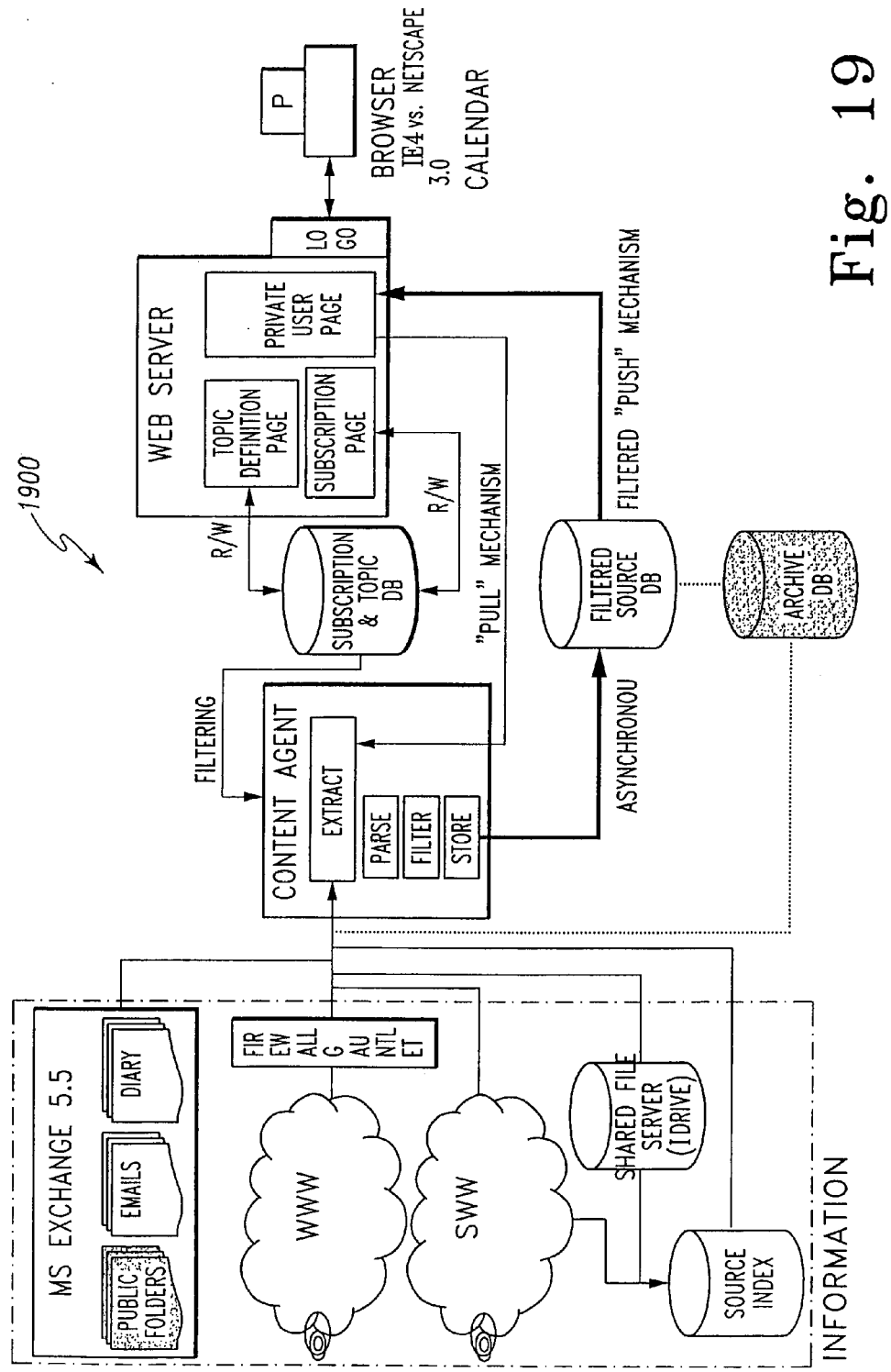
FIG. 19 is a schematic diagram of an exemplary system architecture in accordance with an embodiment of the present invention.

FIG. 19 is a schematic diagram of an exemplary system architecture in accordance with an embodiment of the present invention.

In accordance with an embodiment of the present invention, a BackgroundFinder (BF) is implemented as an agent responsible for preparing an individual for an upcoming meeting by helping him/her retrieve relevant information about the meeting from various sources. BF receives input text in character form indicative of the target meeting. The input text is generated in accordance with an embodiment of the present invention by a calendar program that includes the time of the meeting. As the time of the meeting approaches, the calendar program is queried to obtain the text of the target event and that information is utilized as input to the agent. Then, the agent parses the input meeting text to extract its various components such as title, body, participants, location, time etc. The system also performs pattern matching to identify particular meeting fields in a meeting text. This information is utilized to query various sources of information on the web and obtain relevant stories about the current meeting to send back to the calendaring system. For example, if an individual has a meeting with Netscape and Microsoft to talk about their disputes, and would obtain this initial information from the calendaring system. It will then parse out the text to realize that the companies in the meeting are "Netscape" and "Microsoft" and the topic is "disputes." Then, the system queries the web for relevant information concerning the topic. Thus, in accordance with an objective of the invention, the system updates the calendaring system and eventually the user with the best information it can gather to prepare the user for the target meeting. In accordance with an embodiment of the present invention, the information is stored in a file that is obtained via selection from a link imbedded in the calendar system.

Program Organization:

A computer program in accordance with an embodiment of the present invention is organized in five distinct modules: BF.Main, BF.Parse, Background Finder.Error, BF.PatternMatching and BF.Search. There is also a frmMain which provides a user interface used only for debugging purposes. The executable programs in accordance with an embodiment of the present invention never execute with the user interface and should only return to the calendaring system through Microsoft's Winsock control. An embodiment of the system executes in two different modes which can be specified under the command line sent to it by the calendaring system. When the system runs in simple mode, it executes a keyword query to submit to external search engines. When executed in complex mode, the system performs pattern matching before it forms a query to be sent to a search engine.

Data Structures:

The system in accordance with an embodiment of the present invention utilizes three user defined structures:
TMeetingRecord;
TPatternElement; and
TPatternRecord.

The user-defined structure, tMeetingRecord, is used to store all the pertinent information concerning a single meeting. This info includes userID, an original description of the meeting, the extracted list of keywords from the title and body of meeting etc. It is important to note that only one meeting record is created per instance of the system in accordance with an embodiment of the present invention. This is because each time the system is spawned to service an upcoming meeting, it is assigned a task to retrieve information for only one meeting. Therefore, the meeting record created corresponds to the current meeting examined.

ParseMeetingText populates this meeting record and it is then passed around to provide information about the meeting to other functions.

If GoPatternMatch can bind any values to a particular meeting field, the corresponding entries in the meeting record is also updated. The structure of tMeetingRecord with each field described in parentheses is provided below in accordance with an embodiment of the present invention.

| Public Type tMeetingRecord | |
|---|---|
| sUserID As String | (user id given by Munin) |
| sTitleOrig As String | (original non stop listed title we need to keep around to send back to Munin) |
| sTitleKW As String | (stoplisted title with only keywords) |
| sBodyKW As String | (stoplisted body with only keywords) |
| sCompany( ) As String | (companies identified in title or body through pattern matching) |
| sTopic( ) As String | (topics identified in title or body through pattern matching) |
| sPeople( ) As String | (people identified in title or body through pattern matching) |
| sWhen( ) As String | (time identified in title or body through pattern matching) |

-continued

| | |
|---|---|
| sWhere( ) As String | (location identified in title or body through pattern matching) |
| sLocation As String | (location as passed in by Munin) |
| sTime As String | (time as passed in by Munin) |
| sParticipants( ) As String | (all participants engaged as passed in by Munin) |
| sMeetingText As String | (the original meeting text w/o userid) |
| End Type | |

There are two other structures which are created to hold each individual pattern utilized in pattern matching. The record tAPatternRecord is an array containing all the components/elements of a pattern. The type tAPatternElement is an array of strings which represent an element in a pattern. Because there may be many "substitutes" for each element, we need an array of strings to keep track of what all the substitutes are. The structures of tAPatternElement and tAPatternRecord are presented below in accordance with an embodiment of the present invention.

Public Type tAPatternElement
elementArray( ) As String
End Type
Public Type tAPatternRecord
patternArray( ) As tAPatternElement
End Type User Defined Constants:

Many constants are defined in each declaration section of the program which may need to be updated periodically as part of the process of maintaining the system in accordance with an embodiment of the present invention. The constants are accessible to allow dynamic configuration of the system to occur as updates for maintaining the code.

Included in the following tables are lists of constants from each module which I thought are most likely to be modified from time to time. However, there are also other constants used in the code not included in the following list. It does not mean that these non-included constants will never be changed. It means that they will change much less frequently.

For the Main Module (BF.Main):

| CONSTANT | PRESET VALUE | USE |
|---|---|---|
| MSGTOMUNIN_TYPE | 6 | Define the message number used to identify messages between BF and Munin |
| IP_ADDRESS_MUNIN | "10.2.100.48" | Define the IP address of the machine in which Munin and BF are running on so they can transfer data through UDP. |
| PORT_MUNIN | 7777 | Define the remote port in which we are operating on. |
| TIMEOUT_AV | 60 | Define constants for setting time out in inet controls |
| TIMEOUT_NP | 60 | Define constants for setting time out in inet controls |
| CMD_SEPARATOR | "\" | Define delimiter to tell which part of Munin's command represents the beginning of our input meeting text |
| OUTPARAM_SEPARATO | "::" | Define delimiter for separating out different portions of the output. The separator is for delimiting the msg type, the user id, the meeting title and the beginning of the actual stories retrieved. |

For the Search Module (BF.Search):

| CONSTANT | CURRENT VALU | USE |
| --- | --- | --- |
| PAST_NDAYS | 5 | Define number of days you want to look back for AltaVista articles. Doesn't really matter now because we aren't really doing a news search in alta vista. We want all info. |
| CONNECTOR_AV_URL | "+AND+" | Define how to connect keywords. We want all our keywords in the string so for now use AND. If you want to do an OR or something, just change connector. |
| CONNECTOR_NP_URL | "+AND+" | Define how to connect keywords. We want all our keywords in the string so for now use AND. If you want to do an OR or something, just change connector. |
| NUM_NP_STORIES | 3 | Define the number of stories to return back to Munin from NewsPage. |
| NUM_AV_STORIES | 3 | Define the number of stories to return back to Munin from AltaVista. |

For the Parse Module (BF.Parse):

| CONSTANT | CURRENT VALU | USE |
| --- | --- | --- |
| PORTION_SEPARATOR | "::" | Define the separator between different portions of the meeting text sent in by Munin. For example in "09::Meet with Chad::about life::Chad\|Denise::::: "::" is the separator between different parts of the meeting text. |
| PARTICIPANT_SEPARATOR | "\|" | Define the separator between each participant in the participant list portion of the original meeting text Refer to example above. |

For Pattern Matching Module (BFPatternMatch): There are no constants in this module which require frequent updates.

Figure 20:
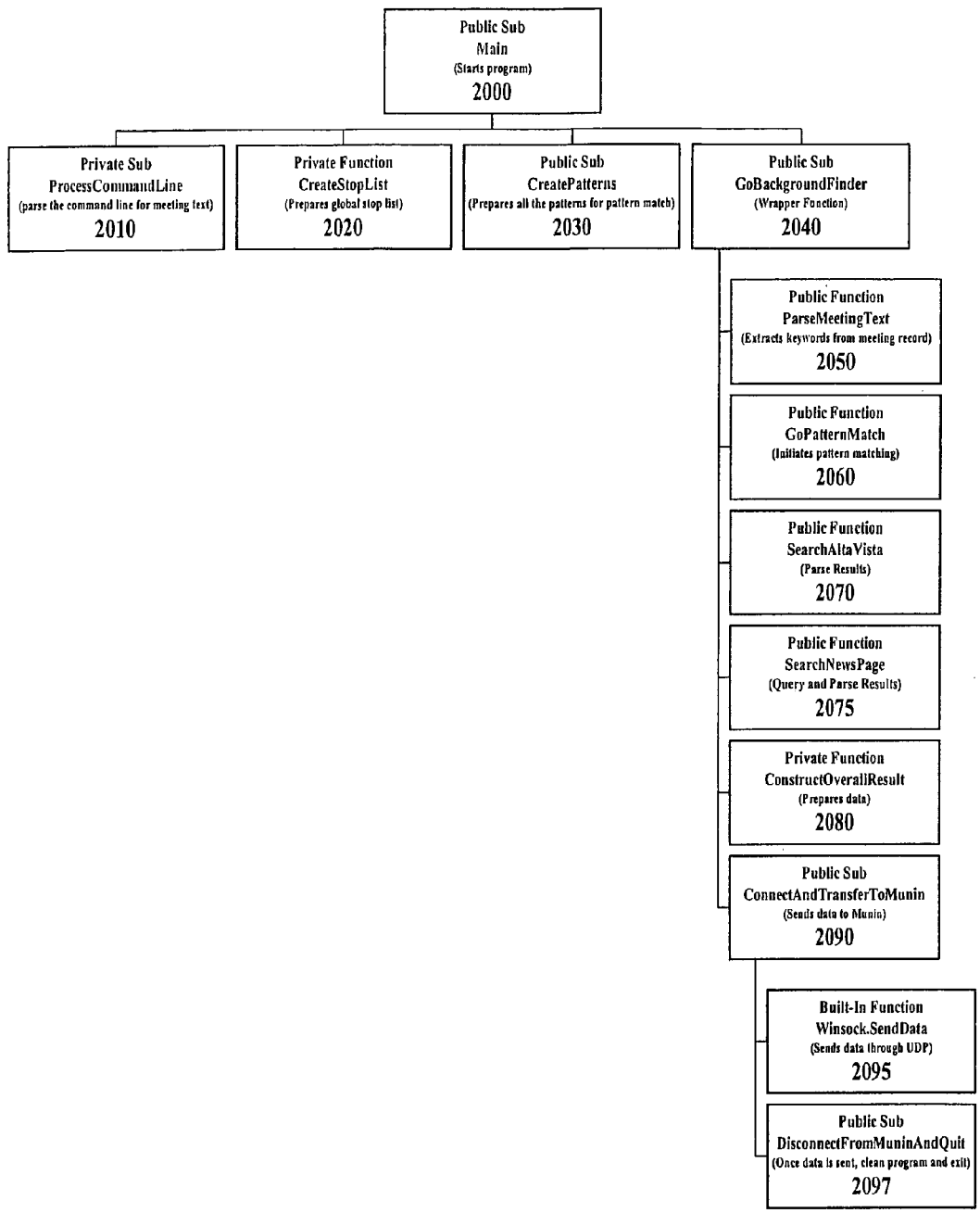
FIG. 20 is a flowchart of the system in accordance with an embodiment of the present invention.

General Process Flow:

The best way to depict the process flow and the coordination of functions between each other is with the five flowcharts illustrated in FIGS. 20 to 24. FIG. 20 depicts the overall process flow in accordance with an embodiment of the present invention. Processing commences at the top of the chart at function block 2000 which launches when the program starts. Once the application is started, the command line is parsed to remove the appropriate meeting text to initiate the target of the background find operation in accordance with an embodiment of the present invention as shown in function block 2010. A global stop list is generated after the target is determined as shown in function block 2020. Then, all the patterns that are utilized for matching operations are generated as illustrated in function block 2030. Then, by tracing through the chart, function block 2000 invokes GoBF 2040 which is responsible for logical processing associated with wrapping the correct search query information for the particular target search engine. For example, function block 2040 flows to function block 2050 and it then calls GoPatternMatch as shown in function block 2060. To see the process flow of GoPatternMatch, we swap to the diagram titled "Process Flow for BF's Pattern Matching Unit."

One key thing to notice is that functions depicted at the same level of the chart are called by in sequential order from left to right (or top to bottom) by their common parent function. For example, Main 2000 calls ProcessCommandLine 2010, then CreateStopListist 2020, then CreatePatterns 2030, then GoBackgroundFinder 2040. FIGS. 21 to 24 detail the logic for the entire program, the parsing unit, the pattern matching unit and the search unit respectively. FIG. 24 details the logic determinative of data flow of key information through BackgroundFinder, and shows the functions that are responsible for creating or processing such information.

DETAILED SEARCH ARCHITECTURE UNDER THE BASIC SEARCH/SIMPLE QUERY MODE

Search ALTA VISTA (Function Block 2070 of FIG. 20):

The Alta Vista search engine utilizes the identifies and returns general information about topics related to the current meeting as shown in function block 270 of FIG. 2. The system in accordance with an embodiment of the present invention takes all the keywords from the title portion of the original meeting text and constructs an advanced query to send to Alta Vista. The keywords are logically combined together in the query. The results are also ranked based on the same set of keywords. One of ordinary skill in the art will readily comprehend that a date restriction or publisher criteria could be facilitated on the articles we want to retrieve. A set of top ranking stories are returned to the calendaring system in accordance with an embodiment of the present invention.

NewsPage (Function Block 2075 of FIG. 20):

The NewsPage search system is responsible for giving us the latest news topics related to a target meeting. The system takes all of the keywords from the title portion of the original meeting text and constructs a query to send to the NewsPage search engine. The keywords are logically combined together in the query. Only articles published recently are retrieved. The NewsPage search system provides a date restriction criteria that is settable by a user according to the user's preference. The top ranking stories are returned to the calendaring system.

Figure 21:
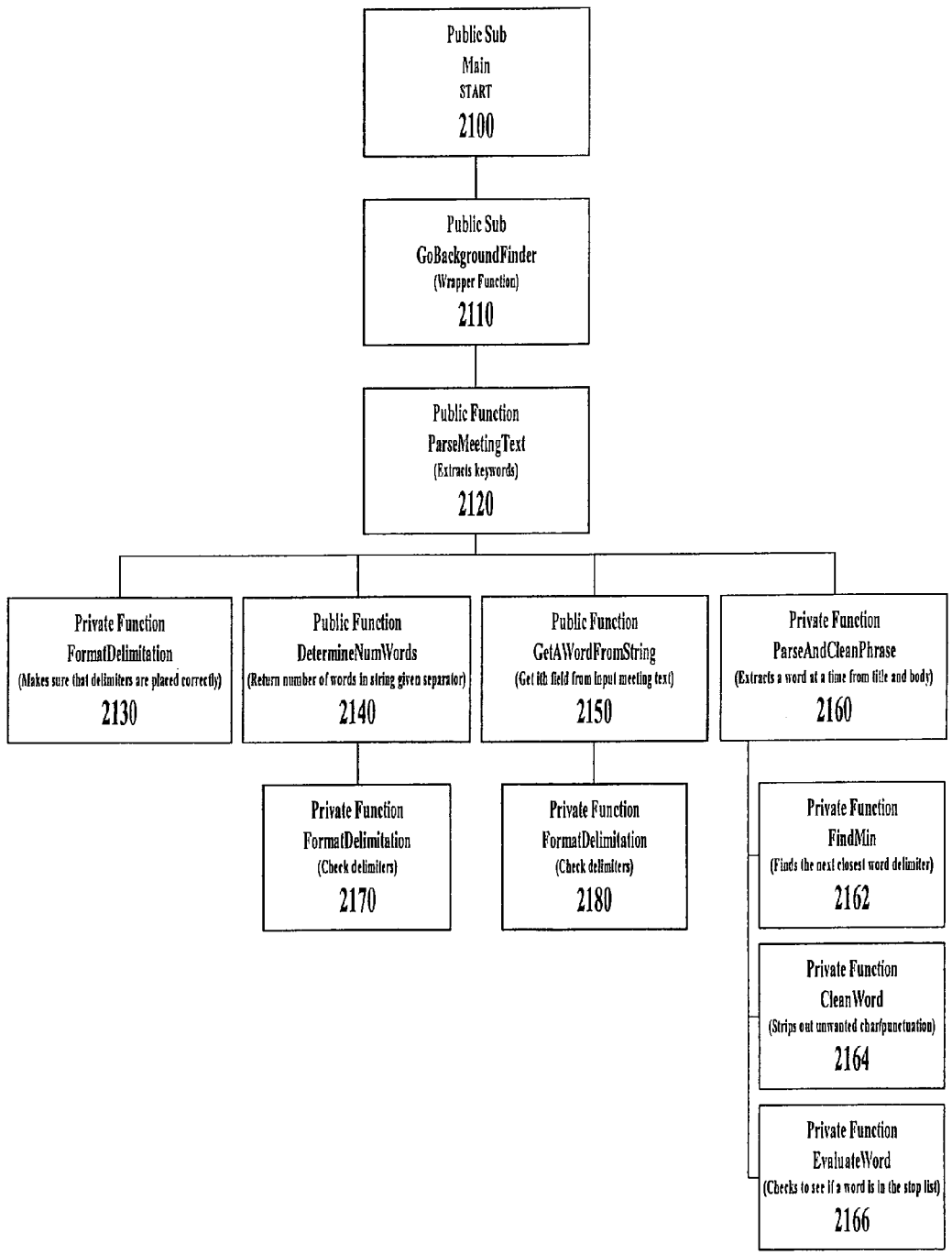
FIG. 21 is a flowchart of a parsing unit of the system in accordance with an embodiment of the present invention.

FIG. 21 is a user profile data model in accordance with an embodiment of the present invention. Processing commences at function block 2100 which is responsible for invoking the program from the main module. Then, at function block 2110, a wrapper function is invoked to prepare for the keyword extraction processing in function block 2120. After the keywords are extracted, then processing flows to function block 2130 to determine if the delimiters are properly positioned. Then, at function block 2140, the number of words in a particular string is calculated and the delimiters for the particular field are and a particular field from the meeting text is retrieved at function block 2150. Then, at function block 2180, the delimiters of the string are again checked to assure they are placed appropriately. Finally, at function block 2160, the extraction of each word from the title and body of the message is performed a word at a time utilizing the logic in function block 2162 which finds the next closest word delimiter in the input phrase, function block 2164 which strips unnecessary materials from a word and function block 2166 which determines if a word is on the stop list and returns an error if the word is on the stop list.

Pattern Matching:

Limitations associated with a simple searching method include:

1. Because it relies on a stop list of unwanted words in order to extract from the meeting text a set of keywords, it is limited by how comprehensive the stop list is. Instead of trying to figure out what parts of the meeting text we should throw away, we should focus on what parts of the meeting text we want.
2. A simple search method in accordance with an embodiment of the present invention only uses the keywords from a meeting title to form queries to send to Alta Vista and NewsPage. This ignores an alternative source of information for the query, the body of the meeting notice. We cannot include the keywords from the meeting body to form our queries because this often results in queries which are too long and so complex that we often obtain no meaningful results.
3. There is no way for us to tell what each keyword represents. For example, we may extract "Andy" and "Grove" as two keywords. However, a simplistic search has no way knowing that "Andy Grove" is in fact a person's name. Imagine the possibilities if we could somehow intelligently guess that "Andy Grove" is a person's name. We can find out if he is an Andersen person and if so what kind of projects he's been on before etc. etc.
4. In summary, by relying solely on a stop list to parse out unnecessary words, we suffer from "information overload".

Pattern Matching Overcomes These Limitations:

Here's how the pattern matching system can address each of the corresponding issues above in accordance with an embodiment of the present invention.

1. By doing pattern matching, we match up only parts of the meeting text that we want and extract those parts.
2. By performing pattern matching on the meeting body and extracting only the parts from the meeting body that we want. Our meeting body will not go to complete waste then.
3. Pattern matching is based on a set of templates that we specify, allowing us to identify people names, company names etc from a meeting text.
4. In summary, with pattern matching, we no longer suffer from information overload. Of course, the big problem is how well our pattern matching works. If we rely exclusively on artificial intelligence processing, we do not have a 100% hit rate. We are able to identify about 20% of all company names presented to us.

Patterns:

A pattern in the context of an embodiment of the present invention is a template specifying the structure of a phrase we are looking for in a meeting text. The patterns supported by an embodiment of the present invention are selected because they are templates of phrases which have a high probability of appearing in someone's meeting text. For example, when entering a meeting in a calendar, many would write something such as "Meet with Bob Dutton from Stanford University next Tuesday." A common pattern would then be something like the word "with" followed by a person's name (in this example it is Bob Dutton) followed by the word "from" and ending with an organization's name (in this case, it is Stanford University).

Pattern Matching Terminology:

Terminology associated with pattern matching includes:

Pattern: a pattern is a template specifying the structure of a phrase we want to bind the meeting text to. It contains sub units.

Element: a pattern can contain many sub-units. These subunits are called elements. For example, in the pattern "with $PEOPLE$ from $COMPANY$", "with" "$PEOPLE$" "from" "$COMPANY$" are all elements.

Placeholder: a placeholder is a special kind of element in which we want to bind a value to. Using the above example, "$PEOPLE$" is a placeholder.

Indicator: an indicator is another kind of element which we want to find in a meeting text but no value needs to bind to it. There may be often more than one indicator we are looking for in a certain pattern. That is why an indicator is not an "atomic" type.

Substitute: substitutes are a set of indicators which are all synonyms of each other. Finding any one of them in the input is good.

There may be five fields which are identified for each meeting:

Company ($COMPANY$)
People ($PEOPLE$)
Location ($LOCATION$)
Time ($TIME$)
Topic ($TOPIC_UPPER$) or ($TOPIC_ALL$)

In parentheses are the illustrative placeholders used in the code as representation of the corresponding meeting fields.

Each placeholder may have the following meaning:

$COMPANY$: binds a string of capitalized words (e.g., Meet with Joe Carter of <Andersen Consulting>)

$PEOPLE$: binds series of string of two capitalized words potentially connected by ",", "and" or "&" (e.g., Meet with <Joe Carter> of Andersen Consulting, Meet with <Joe Carter and Luke Hughes> of Andersen Consulting)

$LOCATION$: binds a string of capitalized words (e.g., Meet Susan at <Palo Alto Square>)

$TIME$: binds a string containing the format #:## (e.g., Dinner at <6:30 pm>)

$TOPIC_UPPER$: binds a string of capitalized words for our topic (e.g., <Stanford Engineering Recruiting> Meeting to talk about new hires).

$TOPIC_ALL$: binds a string of words without really caring if it's capitalized or not. (e.g., Meet to talk about <ubiquitous computing>)

The following table represents patterns supported by BF. Each pattern belongs to a pattern group. All patterns within a pattern group share a similar format and they only differ from each other in terms of what indicators are used as substitutes. Note that the patterns which are grayed out are also commented in the code. BF has the capability to support these patterns but we decided that matching these patterns is not essential at this point.

| | | | |
|---|---|---|---|
| 1 | 1.1.1.1.1.1 | $PEOPLE$ of $COMPANY$ | Paul Maritz of Microsoft |
| | b | $PEOPLE$ from $COMPANY$ | Bill Gates, Paul Allen and Paul Maritz from Microsoft |
| 2 | a | $TOPIC_UPPER$ meeting | Push Technology Meeting |
| | b | $TOPIC_UPPER$ mtg | Push Technology Mtg |
| | c | $TOPIC_UPPER$ demo | Push Technology demo |
| | d | $TOPIC_UPPER$ interview | Push Technology interview |
| | e | $TOPIC_UPPER$ presentation | Push Technology presentation |
| | f | $TOPIC_UPPER$ visit | Push Technology visit |
| | g | $TOPIC_UPPER$ briefing | Push Technology briefing |
| | h | $TOPIC_UPPER$ discussion | Push Technology discussion |
| | i | $TOPIC_UPPER$ workshop | Push Technology workshop |
| | j | $TOPIC_UPPER$ prep | Push Technology prep |
| | k | $TOPIC_UPPER$ review | Push Technology review |
| | l | $TOPIC_UPPER$ lunch | Push Technology lunch |
| | m | $TOPIC_UPPER$ project | Push Technology project |
| | n | $TOPIC_UPPER$ projects | Push Technology projects |
| 3 | a | $COMPANY$ corporation | Intel Corporation |
| | b | $COMPANY$ corp. | IBM Corp. |
| | c | $COMPANY$ systems | Cisco Systems |
| | d | $COMPANY$ limited | IBM limited |
| | e | $COMPANY$ ltd | IBM ltd |
| 4 | a | about $TOPIC_ALL$ | About intelligent agents technology |
| | b | discuss $TOPIC_ALL$ | Discuss intelligent agents technology |
| | c | show $TOPIC_ALL$ | Show the client our intelligent agents technology |
| | d | re: $TOPIC_ALL$ | re: intelligent agents technology |
| | e | review $TOPIC_ALL$ | Review intelligent agents technology |
| | f | agenda | The agenda is as follows: clean up clean up clean up |
| | g | agenda: $TOPIC_ALL$ | Agenda: demo client intelligent agents technology. demo ecommerce. |
| 5 | a | w/$PEOPLE$ of $COMPANY$ | Meet w/Joe Carter of Andersen Consulting |
| | b | w/$PEOPLE$ from $COMPANY$ | Meet w/Joe Carter from Andersen Consulting |
| 6 | a | w/$COMPANY$ per $PEOPLE$ | Talk w/Intel per Jason Foster |
| 7 | | At $TIME$ | at 1:00 pm |
| | | Around $TIME$ | Around 1:00 pm |
| 8 | a | At $LOCATION$ | At LuLu's resturant |
| | b | In $LOCATION$ | in Santa Clara |
| 9 | a | Per $PEOPLE$ | per Susan Butler |
| 10 | a | call w/$PEOPLE$ | Conf call w/John Smith |
| | B | call with $PEOPLE$ | Conf call with John Smith |
| 11 | A | prep for $TOPIC_ALL$ | Prep for London meeting |
| | B | preparation for $TOPIC_ALL$ | Preparation for London meeting |

Figure 22:
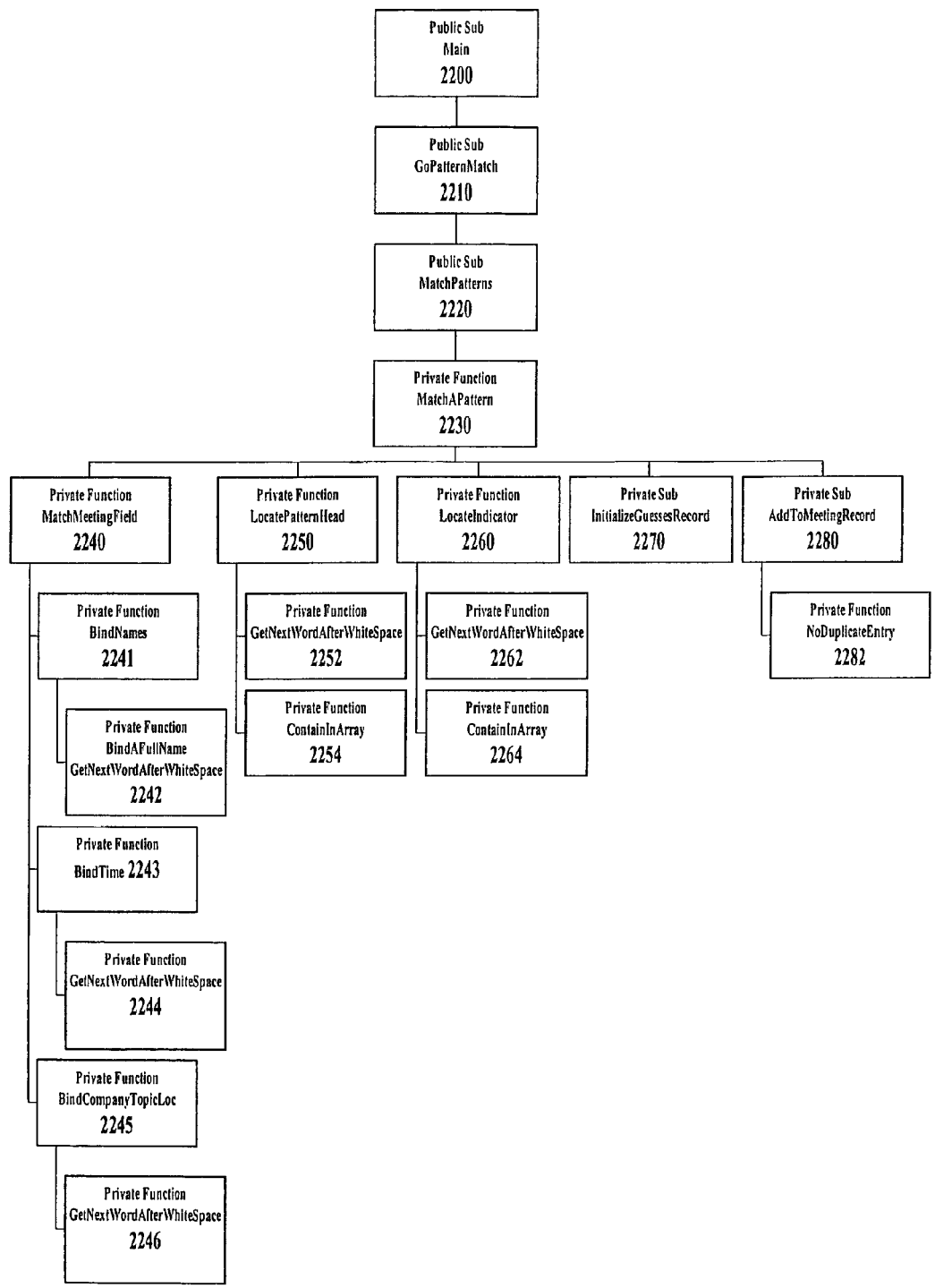
FIG. 22 is a flowchart for pattern matching in accordance with an embodiment of the present invention.

FIG. 22 is a detailed flowchart of pattern matching in accordance with an embodiment of the present invention. Processing commences at function block 2200 where the main program invokes the pattern matching application and passes control to function block 2210 to commence the pattern match processing. Then, at function block 2220, the wrapper function loops through to process each pattern which includes determining if a part of the text string can be bound to a pattern as shown in function block 2230. Then, at function block 2240, various placeholders are bound to values if they exist, and in function block 2241, a list of names separated by punctuation are bound, and at function block 2242 a full name is processed by finding two capitalized words as a full name and grabbing the next letter after a space after a word to determine if it is capitalized. Then, at function block 2243, time is parsed out of the string in an appropriate manner and the next word after a blank space in function block 2244. Then, at function block 2245, the continuous phrases of capitalized words such as company, topic or location are bound and in function block 2246, the next word after the blank is obtained for further processing in accordance with an embodiment of the present invention. Following the match meeting field processing, function block 2250 is utilized to locate an indicator which is the head of a pattern, the next word after the blank is obtained as shown in function block 2252 and the word is checked to determine if the word is an indicator as shown in function block 2254. Then, at function block 2260, the string is parsed to locate an indicator which is not at the end of the pattern and the next word after unnecessary white space such as that following a line feed or a carriage return is processed as shown in function block 2262 and the word is analyzed to determine if it is an indicator as shown in function block 2264. Then, in function block 2270, the temporary record is reset to the null set to prepare it for processing the next string and at function block 2280, the meeting record is updated and at function block 2282 a check is performed to determine if an entry is already made to the meeting record before parsing the meeting record again.

Using the Identified Meeting Fields:

Now that we have identified fields within the meeting text which we consider important, there are quite a few things we can do with it. One of the most important applications of pattern matching is of course to improve the query we construct which eventually gets submitted to Alta Vista and News Page. There are also a lot of other options and enhancements which exploit the results of pattern matching that we can add to BF. These other options will be described in the next section. The goal of this section is to give the reader a good sense of how the results obtained from pattern matching can be used to help us obtain better search results.

Figure 23:
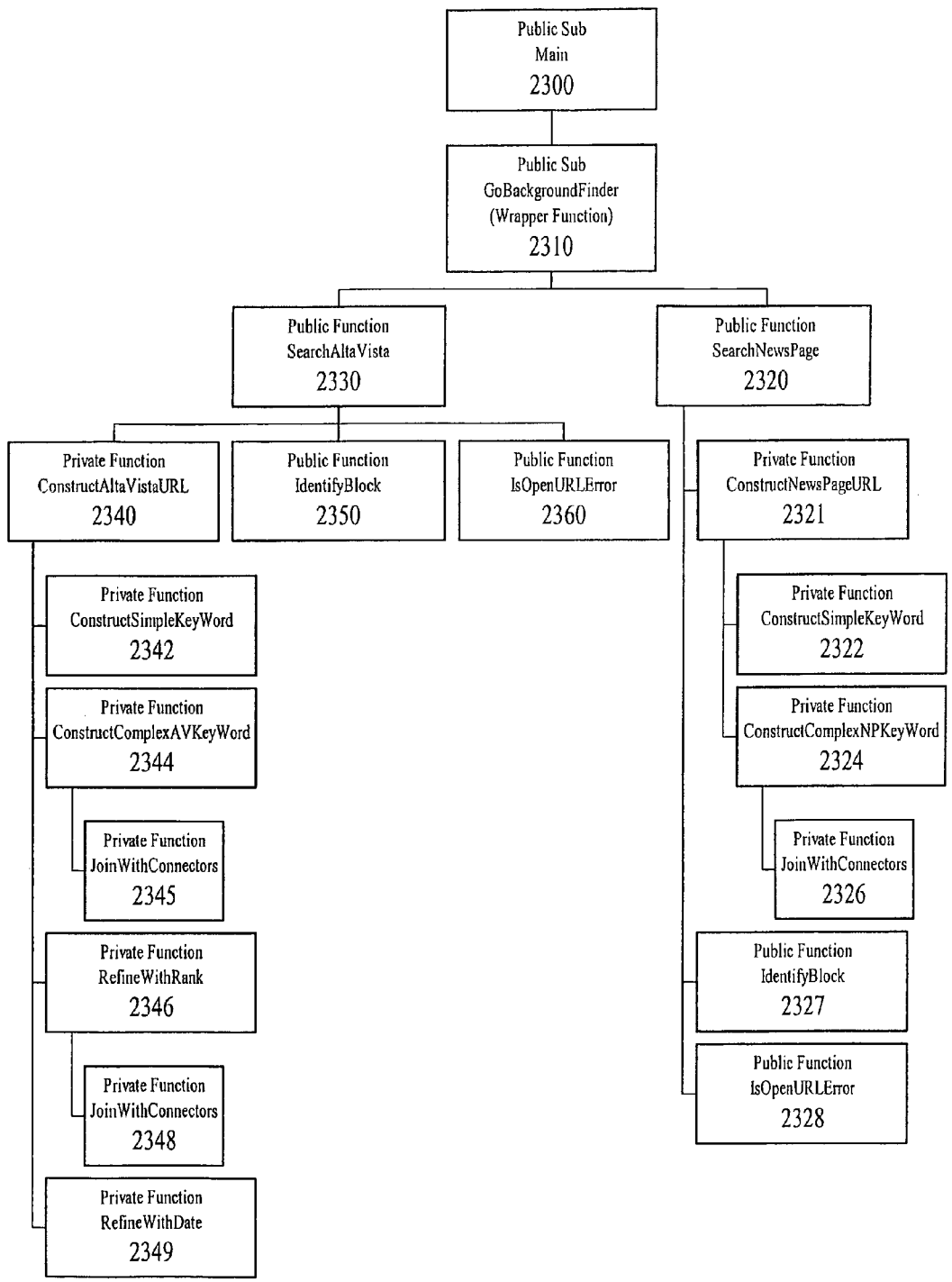
FIG. 23 is a flowchart for a search unit in accordance with an embodiment of the present invention.
Figure 24:
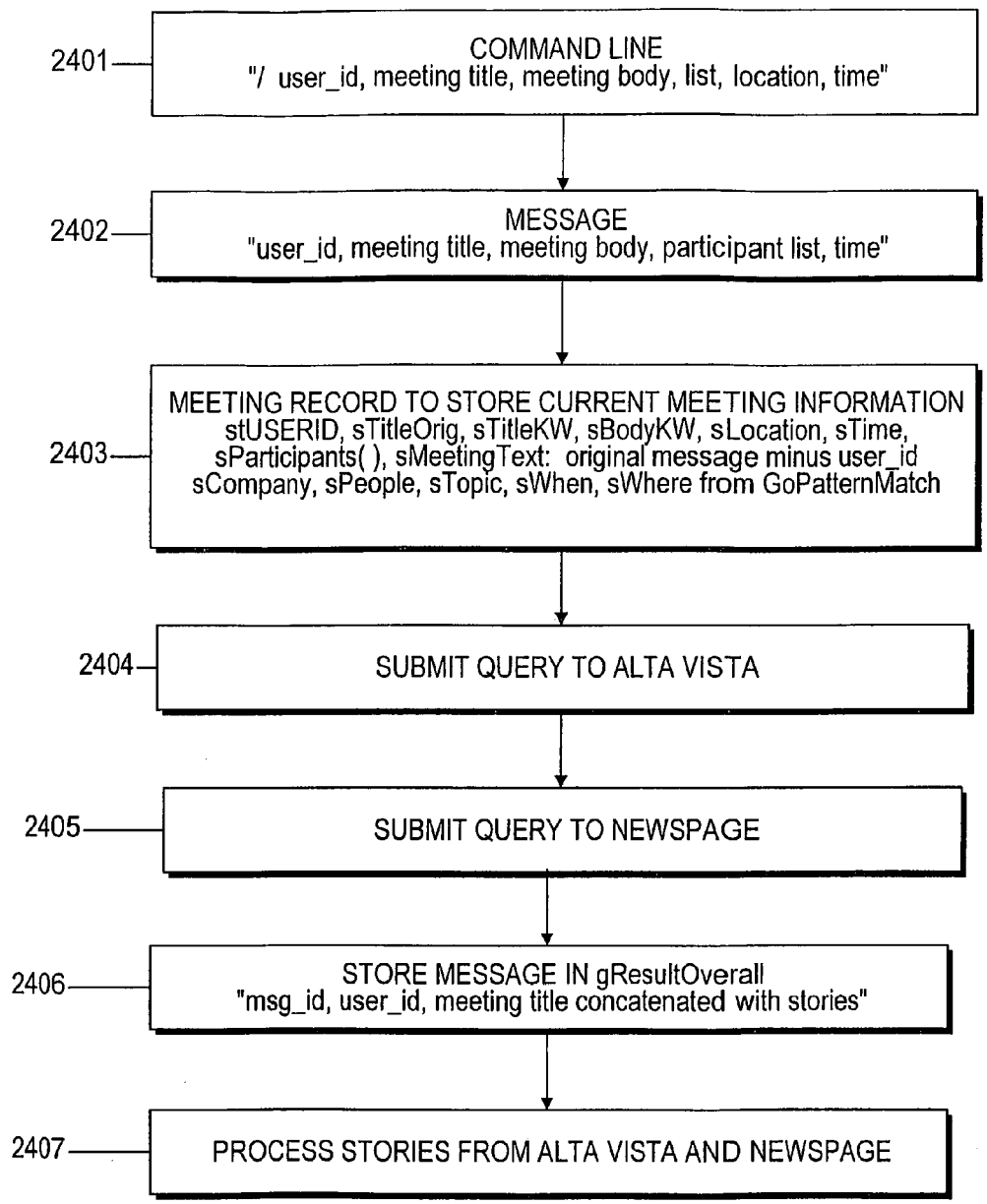
FIG. 24 is a flowchart for overall system processing in accordance with an embodiment of the present invention.

FIG. 23 shows a flowchart of the detailed processing for preparing a query and obtaining information from the Internet in accordance with an embodiment of the present invention. Processing commences at function block 2300 and immediately flows to function block 2310 to process the wrapper functionality to prepare for an Internet search utilizing a web search engine. If the search is to utilize the Alta Vista search engine, then at function block 2330, the system takes information from the meeting record and forms a query in function blocks 2340 to 2360 for submittal to the search engine. If the search is to utilize the NewsPage search engine, then at function block 2320, the system takes information from the meeting record and forms a query in function blocks 2321 to 2328.

Alta Vista Search Engine:

A strength of the Alta Vista search engine is that it provides enhanced flexibility. Using its advance query method, one can construct all sorts of Boolean queries and rank the search however you want. However, one of the biggest drawbacks with Alta Vista is that it is not very good at handling a large query and is likely to give back irrelevant results. If we can identify the topic and the company within a meeting text, we can form a pretty short but comprehensive query which will hopefully yield better results. We also want to focus on the topics found. It may not be of much merit to the user to find out info about a company especially if the user already knows the company well and has had numerous meetings with them. It's the topics they want to research on.

Figure 25:
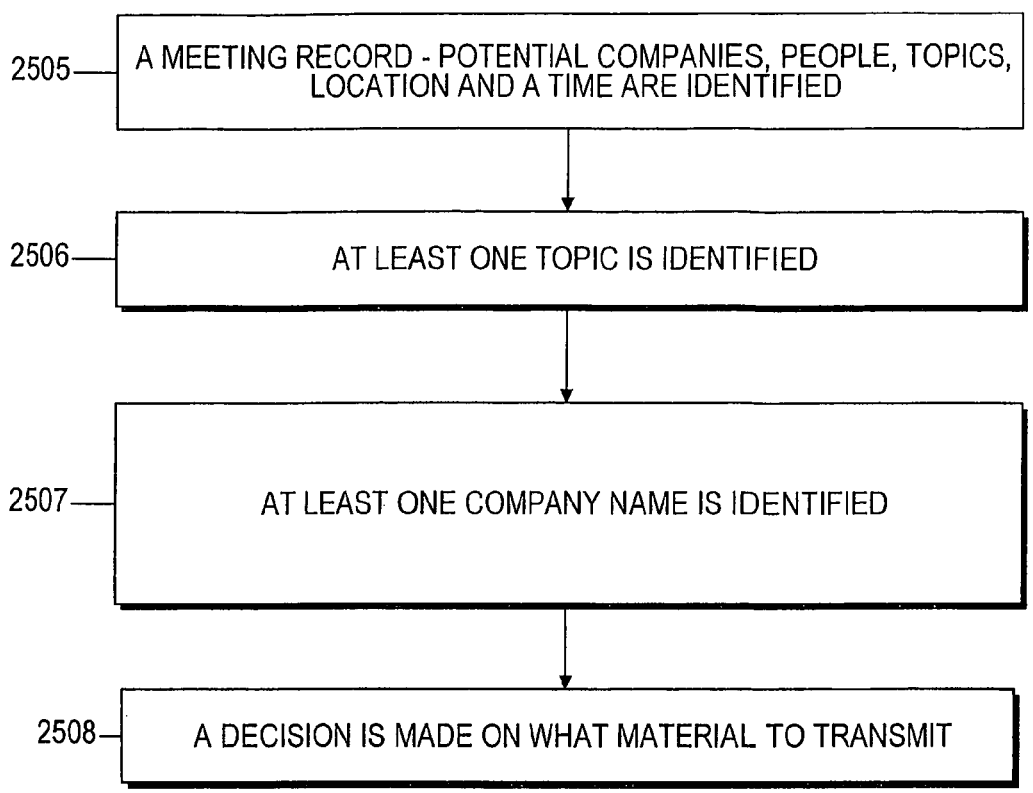
FIG. 25 is a flowchart of topic processing in accordance with an embodiment of the present invention.
Figure 26:
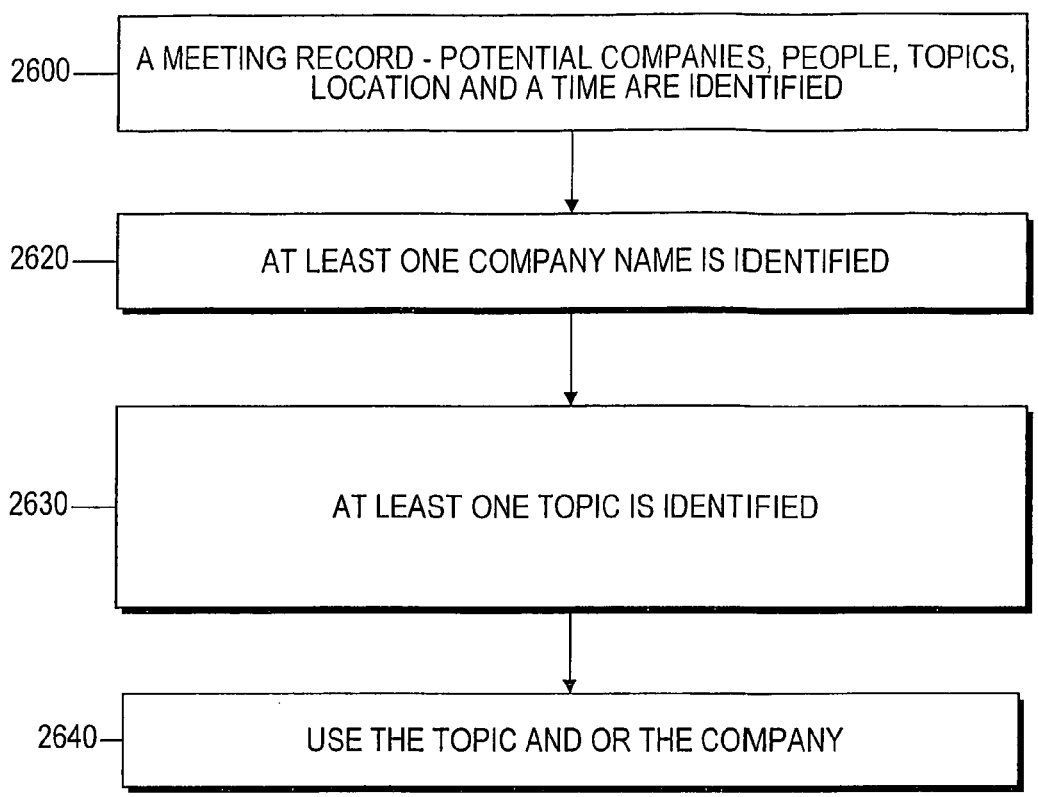
FIG. 26 is a flowchart of meeting record processing in accordance with an embodiment of the present invention.

News Page Search Engine:

A strength of the News Page search engine is that it does a great job searching for the most recent news if you are able to give it a valid company name. Therefore when we submit a query to the news page web site, we send whatever company name we can identify and only if we cannot find one do we use the topics found to form a query. If neither one is found, then no search is performed. The algorithm utilized to form the query to submit to Alta Vista is illustrated in FIG. 25. The algorithm that we will use to form the query to submit to News Page is illustrated in FIG. 26.

The following table describes in detail each function in accordance with an embodiment of the present invention. The order in which functions appear mimics the process flow as closely as possible. When there are situations in which a function is called several times, this function will be listed after the first function which calls it and its description is not duplicated after every subsequent function which calls it.

| | | | |
|---|---|---|---|
| Main (BF.Main) | Public Sub | None | This is the main function where the program first launches. It initializes BF with the appropriate parameters(e.g. Internet time-out, stoplist...) and calls GoBF to launch the main part of the program. |
| ProcessCommandLine (BF.Main) | Private Sub | Main | This function parses the command line. It assumes that the delimiter indicating the beginning of input from Munin is stored in the constant CMD_SEPARATOR. |
| CreateStopList (BF.Main) | Private Function | Main | This function sets up a stop list for future use to parse out unwanted words from the meeting text. There are commas on each side of each word to enable straight checking. |
| CreatePatterns (BF.Pattern Match) | Public Sub | Main | This procedure is called once when BF is first initialized to create all the potential patterns that portions of the meeting text can bind to. A pattern can contain however many elements as needed. There are two types of elements. The first type of elements are indicators. These are real words which delimit the potential of a meeting field (e.g. company) to follow. Most of these indicators are stop words as expected because stop words are words usually common to all meeting text so it makes sense they form patterns. The second type of elements are |

-continued

| | | | |
|---|---|---|---|
| | | | special strings which represent placeholders. A placeholder is always in the form of $*$ where * can be either PEOPLE, COMPANY, TOPIC_UPPER, TIME, LOCATION or TOPIC_ALL. A pattern can begin with either one of the two types of elements and can be however long, involving however any number/type of elements. This procedure dynamically creates a new pattern record for each pattern in the table and it also dynamically creates new tAPatternElements for each element within a pattern. In addition, there is the concept of being able to substitute indicators within a pattern. For example, the pattern $PEOPLE$ of $COMPANY$ is similar to the pattern $PEOPLE$ from $COMPANY$. "from" is a substitute for "of". Our structure should be able to express such a need for substitution. |
| GoBF (BF.Main) | Public Sub | Main | This is a wrapper proceduror that calls both the parsing and the searching subroutines of the BF. It is also responsible for sending data back to Munin. |
| ParseMeetingText (BF.Parse) | Public Function | GoBackGroundFinder | This function takes the initial meeting text and identifies the userID of the record as well as other parts of the meeting text including the title, body, participant list, location and time. In addition, we call a helper function ProcessStopList to eliminate all the unwanted words from the original meeting title and meeting body so that only keywords are left. The information parsed out is stored in the MeetingRecord structure. Note that this function does no error checking and for the most time assumes that the meeting text string is correctly formatted by Munin. The important variable is thisMeeting Record is the temp holder for all info regarding current meeting. It's eventually returned to caller. |
| FormatDelimitation (BF.Parse) | Private | ParseMeetingText, DetermineNumWords, GetAWordFromString | There are 4 ways in which the delimiters can be placed. We take care of all these cases by reducing them down to Case 4 in which there are no delimiters around but only between fields in a string(e.g. A::B::C) |
| DetermineNumWords (BF.Parse) | Public Function | ParseMeetingText, ProcessStopList | This functions determines how many words there are in a string (stInEvalString) The |

-continued

| | | | |
|---|---|---|---|
| GetAWordFromString (BF.Parse) | Public Function | ParseMeetingText, ProcessStopList | function assumes that each word is separated by a designated separator as specified in stSeparator. The return type is an integer that indicates how many words have been found assuming each word in the string is separated by stSeparator. This function is always used along with GetAWordFromString and should be called before calling GetAWordFromString. This function extracts the ith word of the string(stInEvalString) assuming that each word in the string is separated by a designated separator contained in the variable stSeparator. In most cases, use this function with DetermineNumWords. The function returns the wanted word. This function checks to make sure that iInWordNum is within bounds so that i is not greater than the total number of words in string or less than/equal to zero. If it is out of bounds, we return empty string to indicate we can't get anything. We try to make sure this doesn't happen by calling DetermineNumWords first. |
| ParseAndCleanPhrase (BF.Parse) | Private Function | ParseMeetingText | This function first grabs the word and send it to CleanWord in order strip the stuff that nobody wants. There are things in parseWord that will kill the word, so we will need a method of looping through the body and rejecting words without killing the whole function i guess keep CleanWord and check a return value ok, now I have a word so I need to send it down the parse chain. This chain goes ParseCleanPhrase -> CleanWord -> EvaluateWord. If the word gets through the entire chain without being killed, it will be added at the end to our keyword string. first would be the function that checks for "/" as a delimiter and extracts the parts of that. This I will call "StitchFace" (Denise is more normal and calls it GetAWordFromString) if this finds words, then each of these will be sent, in turn, down the chain. If these get through the entire chain without being added or killed then they will be added rather than tossed. |
| FindMin (BF.Parse) | Private Function | ParseAndCleanPhrase | This function takes in 6 input values and evaluates to see what the minimum non |

| | | | |
|---|---|---|---|
| | | | zero value is. It first creates an array as a holder so that we can sort the five input values in ascending order. Thus the minimum value will be the first non zero value element of the array. If we go through entire array without finding a non zero value, we know that there is an error and we exit the function. |
| CleanWord (BF.Parse) | Private Function | ParseAndCleanPhrase | This function tries to clean up a word in a meeting text. It first of all determines if the string is of a valid length. It then passes it through a series of tests to see it is clean and when needed, it will edit the word and strip unnecessary characters off of it. Such tests includes getting rid of file extensions, non chars, numbers etc. |
| EvaluateWord (BF.Parse) | Private Function | ParseAndCleanPhrase | This function tests to see if this word is in the stop list so it can determine whether to eliminate the word from the original meeting text. If a word is not in the stoplist, it should stay around as a keyword and this function exits beautifully with no errors. However, if the words is a stopword, an error must be returned. We must properly delimit the input test string so we don't accidentally retrieve sub strings. |
| GoPatternMatch (BF.Pattern Match) | Public Sub | GoBF | This procedure is called when our QueryMethod is set to complex query meaning we do want to do all the pattern matching stuff. It's a simple wrapper function which initializes some arrays and then invokes pattern matching on the title and the body. |
| MatchPatterns (BF.Pattern Match) | Public Sub | GoPattern Match | This procedure loops through every pattern in the pattern table and tries to identify different fields within a meeting text specified by sInEvalString. For debugging purposes it also tries to tabulate how many times a certain pattern was triggered and stores it in gTabulate Matches to see which pattern fired the most. gTabulate Matches is stored as a global because we want to be able to run a batch file of 40 or 50 test strings and still be able to know how often a pattern was triggered. |
| MatchAPattern (BF.Pattern Match) | Private Function | MatchPatterns | This function goes through each element in the current pattern. It first evaluates to determine whether element is a placeholder or an indicator. If it is a placeholder, then it will try to bind the placeholder with some value. If it is an indicator, then we try to locate it. There is a trick however. Depending on |

| | | | -continued |
|---|---|---|---|
| | | | whether we are at current element is the head of the pattern or not we want to take different actions. If we are at the head, we want to look for the indicator or the placeholder. If we can't find it, then we know that the current pattern doesn't exist and we quit. However, if it is not the head, then we continue looking, because there may still be a head somewhere. We retry in this case. |
| MatchMeeting Field (BF.Pattern Match) | Private Function | MatchAPattern | This function uses a big switch statement to first determine what kind of placeholder we are talking about and depending on what type of placeholder, we have specific requirements and different binding criteria as specified in the subsequent functions called such as BindNames, BindTime etc. If binding is successful we add it to our guessing record. |
| BindNames (BF.Pattern Match) | Private Function | MatchMeetingField | In this function, we try to match names to the corresponding placeholder $PEOPLE$. Names are defined as any consecutive two words which are capitalized. We also want to retrieve a series of names which are connected by and, or & so we look until we don't see any of these 3 separators anymore. Note that we don't want to bind single word names because it is probably too general anyway so we don't want to produce broad but irrelevant results. This function calls BindAFullName which binds one name so in a sense BindNames collects all the results from BindAFullName. |
| BindAFullName (BF.Pattern Match) | Private Function | BindNames | This function tries to bind a full name. If the $PEOPLE$ placeholder is not the head of the pattern, we know that it has to come right at the beginning of the test string because we've been deleting stuff off the head of the string all along. If it is the head, we search until we find something that looks like a full name. If we can't find it, then there's no such pattern in the text entirely and we quit entirely from this pattern. This should eventually return us to the next pattern in MatchPatterns. |
| GetNextWordAfterWhite Space (BF.Pattern Match) | Private Function | BindAFullName, BindTime, BindCompanyTopicLoc | This function grabs the next word in a test string. It looks for the next word after white spaces, @ or /. The word is defined to end when we encounter another one of these white spaces or separators. |

| | | | -continued |
|---|---|---|---|
| BindTime (BF.Pattern Match) | Private Function | MatchMeetingField | Get the immediate next word and see if it looks like a time pattern. If so we've found a time and so we want to add it to the record. We probably should add more time patterns. But people don't seem to like to enter the time in their titles these days especially since we now have tools like OutLook. |
| BindCompanyTopicLoc (BF.Pattern Match) | Private Function | MatchMeetingField | This function finds a continuous capitalized string and binds it to stMatch which is passed by reference from MatchMeetingField. A continuous capitalized string is a sequence of capitalized words which are not interrupted by things like,. etc. There's probably more stuff we can add to the list of interruptions. |
| LocatePatternHead (BF.Pattern Match) | Private Function | MatchAPattern | This function tries to locate an element which is an indicator. Note that this indicator SHOULD BE AT THE HEAD of the pattern otherwise it would have gone to the function LocateIndicator instead. Therefore, we keep on grabbing the next word until either there's no word for us to grab (quit) or if we find one of the indicators we are looking for. |
| ContainInArray (BF.Pattern Match) | Private Function | LocatePatternHead, LocateIndicator | 'This function is really simple. It loops through all the elements in the array' to find a matching string. |
| LocateIndicator (BF.Pattern Match) | Private Function | MatchAPattern | This function tries to locate an element which is an indicator. Note that this indicator is NOT at the head of the pattern otherwise it would have gone to LocatePatternHead instead. Because of this, if our pattern is to be satisfied, the next word we grab HAS to be the indicator or else we would have failed. Thus we only grab one word, test to see if it is a valid indicator and then return result. |
| InitializeGuessesRecord (BF.Pattern Match) | Private Sub | MatchAPattern | This function reinitializes our temporary test structure because we have already transferred the info to the permanent structure, we can reinitialize it so they each have one element |
| AddToMeetingRecord (BF.Pattern Match) | Private Sub | MatchAPattern | This function is only called when we know that the information stored in tInCurrGuesses is valid meaning that it represents legitimate guesses of meeting fields ready to be stored in the permanent record, tInMeetingRecord. We check to make sure that we do not store duplicates and we also want to clean up what we want to store so that there's no cluttered crap such as punctuations, etc. The |

-continued

| | | | |
|---|---|---|---|
| | | | reason why we don't clean up until now is to save time. We don't waste resources calling ParseAndCleanPhrase until we know for sure that we are going to add it permanently. |
| NoDuplicateEntry (BF.Pattern Match) | Private Function | AddToMeetingRecord | This function loops through each element in the array to make sure that the test string aString is not the same as any of the strings already stored in the array. Slightly different from ContainInArray. |
| SearchAltaVista (BF.Search) | Public Function | GoBackGroundFinder | This function prepares a query to be submitted to AltaVista Search engine. It submits it and then parses the returning result in the appropriate format containing the title, URL and body/summary of each story retrieved. The number of stories retrieved is specified by the constant NUM_AV_STORIES. Important variables include stURLAltaVista used to store query to submit stResultHTML used to store html from page specified by stURLAltaVista. |
| ConstructAltaVistaURL (BF.Search) | Private Function | SearchAltaVista | This function constructs the URL string for the alta vista search engine using the advanced query search mode. It includes the keywords to be used, the language and how we want to rank the search. Depending on whether we want to use the results of our pattern matching unit, we construct our query differently. |
| ConstructSimpleKeyWord (BF.Search) | Private Function | ConstructAltaVistaURl, ConstructNewsPageURL | This function marches down the list of keywords stored in the stTitleKW or stBodyKW fields of the input meeting record and links them up into one string with each keyword separated by a connector as determined by the input variable stInConnector. Returns this newly constructed string. |
| ConstructComplexAVKeyWord (BF.Search) | Private Function | ConstructAltaVistaURL | This function constructs the keywords to be sent to the AltaVista site. Unlike ConstructSimpleKeyWord which simply takes all the keywords from the title to form the query, this function will look at the results of BF's pattern matching process and see if we are able to identify any specific company names or topics for constructing the queries. Query will include company and topic identified and default to simple query if we cannot identify either company or topic. |
| JoinWithConnectors (BF.Search) | Private Function | ConstructComplexAVKeyWord, ConstructComplexNPKeyWord, RefineWithRank | This function simply replaces the spaces between the words within the string with a connector which is |

| | | | -continued |
|---|---|---|---|
| | | | specified by the input. |
| RefineWithDate (NOT CALLED AT THE MOMENT) (BF.Search) | Private Function | ConstructAltaVistaURL | This function constructs the date portion of the alta vista query and returns this portion of the URL as a string. It makes sure that alta vista searches for articles within the past PAST_NDAYS. |
| RefineWithRank (BF.Search) | Private Function | ConstructAltaVistaURL | This function constructs the string needed to be passed to AltaVista in order to rank an advanced query search. If we are constructing the simple query we will take in all the keywords from the title. For the complex query, we will take in words from company and topic, much the same way we formed the query in ConstructComplexAVKeyWord. |
| IdentifyBlock (BF.Parse) | Public Function | SearchAltaVista, SearchNewsPage | This function extracts the block within a string marked by the beginning and the ending tag given as inputs starting at a certain location(iStart). The block retrieved does not include the tags themselves. If the block cannot be identified with the specified delimiters, we return unsuccessful through the parameter iReturnSuccess passed to use by reference. The return type is the block retrieved. |
| IsOpenURLError (BF.Error) | Public Function | SearchAltaVista, SearchNewsPage | This function determines whether the error encountered is that of a timeout error. It restores the mouse to default arrow and then returns true if it is a time out or false otherwise. |
| SearchNewsPage (BF.Search) | Public Function | GoBackGroundFinder | This function prepares a query to be submitted to NewsPage Search engine. It submits it and then parses the returning result in the appropriate format containing the title, URL and body/summary of each story retrieved. The number of stories retrieved is specified by the constant UM_NP_STORIES |
| ConstructNewsPageURL (BF.Search) | Private Function | SearchNewsPage | This function constructs the URL to send to the NewsPage site. It uses the information contained in the input meeting record to determine what keywords to use. Also depending whether we want simple or complex query, we call different functions to form strings. |
| ConstructComplexNPKeyWord (BF.Search) | Private Function | ConstructNewsPageURL | This function constructs the keywords to be sent to the NewsPage site. UnlikeConstructKeyWordString which simply takes all the keywords from the title to form the query, this function will look at the results of BF's pattern matching process and see if we are able to identify any specific company names or topics for constructing the queries. |

-continued

| | | | |
|---|---|---|---|
| ConstructOverallResult (BF.Main) | Private Function | GoBackGroundFinder | This function takes in as input an array of strings (stInStories) and a MeetingRecord which stores the information for the current meeting. Each element in the array stores the stories retrieved from each information source. The function simply constructs the appropriate output to send to Munin including a return message type to let Munin know that it is the BF responding and also the original user_id and meeting title so Munin knows which meeting BF is talking about. |
| ConnectAndTransferToMunin (BF.Main) | Public Sub | GoBackGroundFinder | This function allows Background Finder to connect to Munin and eventually transport information to Munin. We will be using the UDP protocol instead of the TCP protocol so we have to set up the remote host and port correctly. We use a global string to store gResult Overall because although it is unnecessary with UDP, it is needed with TCP and if we ever switch back don't want to change code. |
| DisconnectFromMuninAndQuit (BF.Main) | Public Sub | | |

FIG. 24 shows a flowchart of the actual code utilized to prepare and submit searches to the Alta Vista and NewsPage search engines in accordance with an embodiment of the present invention. Processing commences at function block 2401 where a command line is utilized to update a calendar entry with specific calendar information. The message is next posted in accordance with function block 2402 and a meeting record is created to store the current meeting information in accordance with function block 2403. Then, in function block 2404 the query is submitted to the Alta Vista search engine and in function block 2405, the query is submitted to the NewsPage search engine. When a message is returned from the search engine, it is stored in a results data structure as shown in function block 2406 and the information is processed and stored in summary form in a file for use in preparation for the meeting as detailed in function block 2407.

FIG. 25 provides more detail on creating the query in accordance with an embodiment of the present invention. Processing commences at function block 2505 where the meeting record is parsed to obtain potential companies, people, topics, location and a time. Then, in function block 2506, at least one topic is identified and in function block 2507, at least one company name is identified and finally in function block 2508, a decision is made on what material to transmit to the file for ultimate consumption by the user.

FIG. 26 is a variation on the query theme presented in FIG. 25. A meeting record is parsed in function block 2600, a company is identified in function block 2620, a topic is identified in function block 2630 and finally in function block 2640 the topic and or the company is utilized in formulating the query.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for a knowledgebase framework in a background finder, the method comprising:
   querying a source of target information;
   pattern matching the target information based on a set of phrase structure templates;
   binding at least a part of the target information to at least one phrase structure template included in the set of phrase structure templates;
   extracting an identified field from the bound target information;
   obtaining information relating to the identified field from at least one information source utilizing a network;
   generating a knowledge model-based index for the obtained information using a knowledge model, wherein the generated knowledge model-based index comprises a plurality of items each associated with at least some of the obtained information; and
   displaying the knowledge model-based index to a user utilizing the network.

2. A method as recited in claim 1, further comprising permitting the selection by the user of at least one of the items of the knowledge model-based index; and displaying the information associated with the selected item to the user.

3. A method as recited in claim 2, wherein displaying the information associated with the selected item to the user comprises utilizing the network to retrieve the associated information from the at least one information source from which the associated information was obtained.

4. A method as recited in claim 1, wherein the source of target information is a meeting record that stores all the pertinent information concerning an upcoming meeting.

5. A method as recited in claim 1, wherein the at least one information source comprises at least one of an internal source having controlled access or an external source having uncontrolled access utilizing a wide area network, or combinations thereof.

6. A method as recited in claim 1, further comprising monitoring the at least one information source for updated information relating to at least one of the items of the knowledge model-based index; and generating a notice regarding the updated information for receipt by the user via the network.

7. A method as recited in claim 6, wherein the at least one information source to be monitored is selectable by the user.

8. A method as recited in claim 1, further comprising permitting the user to input a search term utilizing the network, searching the knowledge model-based index for items associated with the search term, and displaying items of the knowledge model-based index associated with the search term to the user utilizing the network.

9. A computer program embodied on a computer readable medium for a knowledgebase framework in a background finder, the computer program comprising:
- a code segment that is executable to perform pattern matching of information included in a data record based on a set of predefined phrase structure templates that each specify a pattern of a plurality of expressions presentable in the data record;
- a code segment that is executable to bind two or more words in the data record in accordance with the specified pattern of one of the set of predefined phrase structure templates;
- a code segment that is executable to obtain information related to at least one of the bound two or more words from at least one source utilizing a network;
- a code segment that is executable to generate a knowledge model-based index for the obtained information using a knowledge model, wherein the generated knowledge model-based index comprises a plurality of items each associated with at least some of the obtained information; and
- a code segment that is executable to display the knowledge model-based index to a user utilizing the network.

10. A computer program as recited in claim 9, further comprising a code segment that is executable to permit the user to select at least one of the items of the knowledge model-based index.

11. A computer program as recited in claim 10, further comprising a code segment that is executable to display to the user the information associated with a selected item utilizing the network.

12. A computer program as recited in claim 11, further comprising a code segment that is executable to utilize the network to retrieve the associated information from the source from which the associated information was obtained.

13. A computer program as recited in claim 9, further comprising a code segment that is executable to provide a restriction criteria that is selectable by a user to limit the information obtained.

14. A computer program as recited in claim 9, wherein the pattern matching is limited to a predetermined portion of the data record.

15. A computer program as recited in claim 9, wherein the at least one source comprises at least one of an internal source having controlled access or an external source having uncontrolled access utilizing a wide area network, or combinations thereof.

16. A computer program as recited in claim 9, further comprising a code segment that is executable to monitor the at least one source for updated information related to at least one of the items of the knowledge model-based index utilizing the network; a code segment that is executable to generate a notice regarding the updated information, and a code segment that is executable to transmit the notice to the user utilizing the network.

17. A computer program as recited in claim 16, further comprising a code segment that is executable to permit a user to select the at least one source to be monitored.

18. A system for a knowledgebase framework in a background finder, comprising:
- logic to perform pattern matching of a phrase within a data record to at least one of a plurality of predefined phrase structured templates;
- logic to bind one or more terms included in the phrase to a matched one of the phrase structured template;
- logic to generate a query that selectively includes one or more of the bound one or more terms;
- logic to obtain information based on the query from at least one source utilizing a network;
- logic to generate a knowledge model-based index for the obtained information using a knowledge model, wherein the generated knowledge model-based index comprises a plurality of items each associated with at least some of the obtained information;
- logic to display the knowledge model-based index to a user utilizing the network;
- logic to permit the user to select at least one of the items of the knowledge model-based index; and
- logic to display the information associated with the selected item to the user utilizing the network.

19. A system as recited in claim 18, further comprising logic to monitor the at least one source for updated information relating to at least one of the items of the knowledge model-based index utilizing the network.

20. A system as recited in claim 19, further comprising logic to generate a notice regarding the updated information, and logic to transmit the notice to the user utilizing the network.

21. A method as recited in claim 1, wherein binding at least a part of the target information comprises binding a predetermined placeholder representative of a field to a value included in the target information, wherein the predetermined placeholder representative of the field is included in the at least one phrase structure template.

22. A method as recited in claim 1, wherein binding at least a part of the target information comprises binding a continuous phrase that is identified within the target information based on a format of the continuous phrase that is defined in the at least one phrase structure template.

23. A method as recited in claim 1, wherein binding at least a part of the target information comprises locating one or more indicators within the target information, and identifying information to be bound based on a predefined relationship of the identified information with the indicators.

24. A computer program as recited in claim 9, further comprising a code segment that is executable to generate a query that selectively includes one or more of the bound two or more words, wherein the query is useable to obtain information from at least one source utilizing the network.

* * * * *

UNITED STATES PATENT AND TRADEMARK OFFICE
CERTIFICATE OF CORRECTION

PATENT NO. : 7,099,854 B2
APPLICATION NO. : 11/060722
DATED : August 29, 2006
INVENTOR(S) : Edy S. Liongosari It is certified that error appears in the above-identified patent and that said Letters Patent is hereby corrected as shown below:

Column 1
Line 5, delete "6,357,205" and insert --6,957,205--.

Column 2
Line 45, delete "are" and insert --area--.

Column 11
Line 58, delete "an".
Line 59, delete "maybe" and insert --may be--.
Line 62, delete "infonnation" and insert --information--.

Column 12
Line 10, after "variety" and before "information" insert --of--.
Line 52, delete "comprises" and insert --comprise--.

Column 16
Line 8, delete "comprises" and insert --comprise--.
Line 39, after "Internet" insert --.--.

Column 17
Line 53, delete "Figure A".

Column 19
Line 32, delete "seem" and insert --seems--.
Line 40, after "Merck" insert --.--.
Line 47, delete "are" and insert --is--.

Column 20
Line 2, delete "one of".

Column 25
Line 62, after "way" and before "knowing" insert --of--.

Column 26
Line 17, after "etc" insert --.--.

Column 32
Line 36, delete "proceduror" and insert --procedure--.

UNITED STATES PATENT AND TRADEMARK OFFICE
CERTIFICATE OF CORRECTION

PATENT NO. : 7,099,854 B2
APPLICATION NO. : 11/060722
DATED : August 29, 2006
INVENTOR(S) : Edy S. Liongosari It is certified that error appears in the above-identified patent and that said Letters Patent is hereby corrected as shown below:

Column 40
Line 52, after "element" insert --.--.

Column 42
Line 37 delete "alta vista" and insert --Alta Vista--.

Column 44
Line 5 delete "alta vista" and insert --Alta Vista--.
Line 8 delete "alta vista" and insert --Alta Vista--.

Column 48
Line 22, delete "template" and insert --templates--.

Signed and Sealed this

Twenty-sixth Day of December, 2006